US012630696B2

(12) United States Patent (10) Patent No.: US 12,630,696 B2

Inoue (45) Date of Patent: May 19, 2026

(54) RUBBER COMPOSITION, AND TIRE

(71) Applicant: Asahi Kasei Kabushiki Kaisha, Tokyo (JP)

(72) Inventor: Yoshihisa Inoue, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 491 days.

(21) Appl. No.: 18/034,471

(22) PCT Filed: Oct. 22, 2021

(86) PCT No.: PCT/JP2021/039141

§ 371 (c)(1),
(2) Date: Apr. 28, 2023

(87) PCT Pub. No.: WO2022/091982

PCT Pub. Date: May 5, 2022

(65) Prior Publication Data

US 2023/0365789 A1     Nov. 16, 2023

(30) Foreign Application Priority Data

Oct. 30, 2020     (JP) ................................ 2020-182774

(51) Int. Cl.
| | |
|---|---|
| *C08L 7/00* | (2006.01) |
| *B60C 1/00* | (2006.01) |
| *C08C 19/02* | (2006.01) |
| *C08K 3/04* | (2006.01) |
| *C08K 3/36* | (2006.01) |

(52) U.S. Cl.
CPC .............. *C08L 7/00* (2013.01); *B60C 1/0016* (2013.01); *C08C 19/02* (2013.01); *C08K 3/04* (2013.01); *C08K 3/36* (2013.01)

(58) Field of Classification Search
CPC .... C08L 7/00; C08K 3/04; C08K 3/06; B60C 1/00
USPC ....................................................... 524/505
See application file for complete search history.

(56) References Cited

U.S. PATENT DOCUMENTS

| | | | | |
|---|---|---|---|---|
| 6,300,416 | B1 * | 10/2001 | Okada ..................... | C08L 23/16 |
| | | | | 525/240 |
| 2003/0130402 | A1 | 7/2003 | Kobayashi et al. | |

| | | | |
|---|---|---|---|
| 2004/0162382 | A1 | 8/2004 | Steiner et al. |
| 2005/0171276 | A1 | 8/2005 | Matsuda et al. |
| 2010/0179247 | A1 | 7/2010 | Vest et al. |
| 2017/0226233 | A1 | 8/2017 | Yamashiro et al. |
| 2017/0226325 | A1 | 8/2017 | Yamashiro et al. |
| 2018/0371216 | A1 | 12/2018 | Pappas et al. |
| 2019/0010313 | A1 | 1/2019 | Yamashiro et al. |
| 2020/0131347 | A1 | 4/2020 | Cabioch et al. |
| 2020/0239675 | A1 | 7/2020 | Tardif et al. |

FOREIGN PATENT DOCUMENTS

| | | | |
|---|---|---|---|
| EP | 3178878 | A1 | 6/2017 |
| EP | 3424750 | A1 | 1/2019 |
| EP | 3988327 | A1 | 4/2022 |
| JP | 2003-253056 | A | 9/2003 |
| JP | 2004-250703 | A | 9/2004 |
| JP | 2009-057475 | A | 3/2009 |
| JP | 2010-522800 | A | 7/2010 |
| JP | 2012-052028 | A | 3/2012 |
| JP | 2012-102240 | A | 5/2012 |
| JP | 2012-136659 | A | 7/2012 |
| JP | 2019-014796 | A | 1/2019 |
| WO | 03/085010 | A1 | 10/2003 |
| WO | 2016/039005 | A1 | 3/2016 |
| WO | 2016/039007 | A1 | 3/2016 |
| WO | 2019/078083 | A1 | 4/2019 |
| WO | 2019/151126 | A1 | 8/2019 |
| WO | 2019/151127 | A1 | 8/2019 |

OTHER PUBLICATIONS

International Search Report issued in corresponding International Patent Application No. PCT/JP2021/039141 dated Dec. 28, 2021.
International Preliminary Report on Patentability and Written Opinion issued in corresponding International Patent Application No. PCT/JP2021/039141 dated May 11, 2023.
Supplementary European Search Report issued in European Patent Application No. 21886100.3 dated Mar. 5, 2024.

* cited by examiner

*Primary Examiner* — Deve V Hall
(74) *Attorney, Agent, or Firm* — Morgan, Lewis & Bockius LLP

(57) ABSTRACT

The present invention provides a rubber composition, containing 10 parts by mass or more and 90 parts by mass or less of a rubber-like polymer having an iodine value of 10 to 200 (g/100 g), a content of an ethylene structure of 3% by mass or more, a content of an aromatic vinyl monomer block of less than 10% by mass, and a content of a conjugated diene monomer unit of 2% by mass or more; 10 parts by mass or more and 90 parts by mass or less of a natural rubber; and 20 parts by mass or more and 80 parts by mass or less of a silica-based inorganic filler and a carbon black, with respect to 100 parts by mass of a total amount of a rubber component.

13 Claims, No Drawings

RUBBER COMPOSITION, AND TIRE

TECHNICAL FIELD

The present invention relates to a rubber composition, and a tire.

BACKGROUND ART

In recent years, a pneumatic tire used in a heavy-load vehicle such as a truck or a bus is required to be improved in low fuel consumption performance and in abrasion resistance of the tire due to social demand for reduction of global environmental load. Besides, from the viewpoint of protection of human life, there are increasing demands for retaining safe and secure in a drive by suppressing performance degradation of the tire otherwise caused at a later stage of use.

For improving low fuel consumption performance of a tire, a technique for blending silica in a cap tread rubber has been conventionally examined. Actually, the low fuel consumption performance is improved by this technique, but if dispersibility of silica is poor, sufficient abrasion resistance cannot be obtained, and there arises a problem that it is difficult to balance low fuel consumption performance and abrasion resistance at a high level.

In addition, a tire is changed in the performance at a later stage of use, and for example, has a problem that ride comfort is deteriorated as the hardness increases.

In recent years, in the fields of rubbers for tire treads, sheets, films and asphalt modification, a rubber composition containing a rubber-like polymer having an ethylene structure and containing a crosslinkable unsaturated group introduced therein has been proposed for purposes of increasing mechanical strength and permanent compression set. When such a rubber-like polymer is contained in a rubber composition for a tire, abrasion resistance of the tire is improved (see, for example, Patent Documents 1 to 4).

A rubber composition containing a rubber-like polymer having an ethylene structure and containing a crosslinkable unsaturated group introduced therein has a small number of unsaturated bonds, and is suppressed in degradation over time, and therefore, suppression of deterioration of ride comfort caused at a later stage of use of the tire can be expected.

CITATION LIST

Patent Document

Patent Document 1: International Publication No. WO2003/085010
Patent Document 2: International Publication No. WO2019/151126
Patent Document 3: International Publication No. WO2019/151127
Patent Document 4: International Publication No. WO2019/078083

SUMMARY OF INVENTION

Technical Problem

When a hydrogenation rate of a rubber-like polymer having an ethylene structure and containing a crosslinkable unsaturated group introduced therein is too high, however, there arises a problem that the Mooney viscosity thereof is so high that processability tends to be lowered.

In addition, according to examinations made by the present inventors, when the hydrogenation rate of the rubber-like polymer is too high, there arises a problem that sufficient dispersibility of silica cannot be obtained in a rubber composition, and hence processability and abrasion resistance tend to be lowered.

Therefore, in consideration of the above-described problems of the conventional techniques, an object of the present invention is to provide a rubber composition that is excellent in processability, low fuel consumption performance, and abrasion resistance, and can suppress performance change even at a later stage of use of a tire.

Solution to Problem

The present inventors have made earnest studies to solve the above-described problems of the conventional techniques, resulting in finding that the above-described problems of the conventional techniques can be solved by a rubber composition containing: a rubber-like polymer specified in an iodine value thereof, a content of an ethylene structure, a content of an aromatic vinyl monomer block, and a content of a conjugated diene monomer unit; a natural rubber; a silica-based inorganic filler as a reinforcing material; and a carbon black respectively in prescribed amounts, and thus the present invention has been accomplished.

Specifically, the present invention provides the following:

[1]

A rubber composition, containing: 10 parts by mass or more and 90 parts by mass or less of a rubber-like polymer having an iodine value of 10 to 200 (g/100 g), a content of an ethylene structure of 3% by mass or more, a content of an aromatic vinyl monomer block of less than 10% by mass, and a content of a conjugated diene monomer unit of 2% by mass or more; 10 parts by mass or more and 90 parts by mass or less of a natural rubber; and 20 parts by mass or more and 80 parts by mass or less of a silica-based inorganic filler and a carbon black, with respect to 100 parts by mass of a total amount of a rubber component including the rubber-like polymer and the natural rubber, wherein a content of the silica-based inorganic filler is 60 parts by mass or less, and a content of the carbon black is 60 parts by mass or less.

[2]

The rubber composition according to [1], wherein the rubber-like polymer has a glass transition temperature (Tg) of −35° C. or less.

[3]

The rubber composition according to [1] or [2], wherein the rubber-like polymer is a conjugated diene-based polymer, and contains 5% by mass or more and 40% by mass or less of an aromatic vinyl monomer unit, and a 1,2-vinyl bond content in a conjugated diene monomer unit is 10 mol % or more and 60 mol % or less.

[4]

The rubber composition according to any one of [1] to [3], wherein the rubber-like polymer contains a nitrogen atom.

[5]

The rubber composition according to [4], wherein the rubber-like polymer has a modification ratio of 40% by mass or more.

[6]

The rubber composition according to any one of [1] to [5], wherein the iodine value (A) of the rubber-like polymer, the content (in parts by mass) (B) of the silica-based inorganic filler and the content (in parts by mass) (C) of the carbon black with respect to 100 parts by mass of the total amount of the rubber component, a BET specific surface area (D) of the silica-based inorganic filler, and a BET specific surface area (E) of the carbon black have a relationship of the following expression (1):

$$0<(0.029\times((B)\times(D))+((C)\times(E)))-(A)<250 \qquad \text{Expression (1):}$$

[7]

The rubber composition according to any one of [1] to [6], further containing an oil and/or a ring-containing resin in an amount of less than 35 parts by mass with respect to 100 parts by mass of the total amount of the rubber component.

[8]

The rubber composition according to any one of [1] to [7], further containing an oil in an amount of less than 10 parts by mass with respect to 100 parts by mass of the total amount of the rubber component.

[9]

The rubber composition according to any one of [1] to [8], wherein the iodine value of the rubber-like polymer is 80 to 200 (g/100 g), and a content of an aromatic vinyl monomer unit is 13% by mass or less.

[10]

The rubber composition according to any one of [1] to [9], wherein a 1,2-vinyl bond content in the conjugated diene monomer unit of the rubber-like polymer is 50 mol % or more and 60 mol % or less.

[11]

The rubber composition according to any one of [1] to [10], wherein the iodine value (A) of the rubber-like polymer, the content (in parts by mass) (B) of the silica-based inorganic filler and the content (in parts by mass) (C) of the carbon black with respect to 100 parts by mass of the total amount of the rubber component, a BET specific surface area (D) of the silica-based inorganic filler, and a BET specific surface area (E) of the carbon black have a relationship of the following expression (2):

$$0<(0.029\times((B)\times(D))+((C)\times(E)))-(A)<136. \qquad \text{Expression (2):}$$

[12]

A tire, containing the rubber composition according to any one of [1] to [11].

[13]

A pneumatic tire, including a cap tread containing the rubber composition according to any one of [1] to [11], and having a load index of 100 or more and 170 or less.

Advantageous Effects of Invention

The present invention can provide a rubber composition that is excellent in processability, low fuel consumption performance, and abrasion resistance, and with which an excellent tire capable of also suppressing performance change at a later stage of use of the tire can be obtained.

DESCRIPTION OF EMBODIMENT

Now, an embodiment for practicing the present invention (hereinafter referred to as the "present embodiment") will be described in detail.

It is noted that the following embodiment is merely illustrative for describing the present invention, and that the present invention is not limited to the following embodiment. The present invention can be practiced with modifications appropriately made within the scope thereof.

[Rubber Composition]

A rubber composition of the present embodiment contains 10 parts by mass or more and 90 parts by mass or less of a rubber-like polymer having an iodine value of 10 to 200 (g/100 g), having a content of an ethylene structure of 3% by mass or more, having a content of an aromatic vinyl monomer block of less than 10% by mass, and having a content of a conjugated diene monomer unit of 2% by mass or more (hereinafter, sometimes simply referred to as the rubber-like polymer), and 10 parts by mass or more and 90 parts by mass or less of a natural rubber.

The rubber composition further contains 20 parts by mass or more and 80 parts by mass or less of a silica-based inorganic filler and a carbon black, with respect to 100 parts by mass of a total amount of a rubber component including the rubber-like polymer and the natural rubber, a content of the silica-based inorganic filler is 60 parts by mass or less, and a content of the carbon black is 60 parts by mass or less.

Owing to this configuration, a rubber composition that is excellent in processability, low fuel consumption performance, and abrasion resistance, and with which an excellent tire capable of suppressing performance change even at a later stage of use of the tire can be obtained is obtained.

The rubber composition of the present embodiment is suitably used in the form of a vulcanizate. The vulcanizate can be obtained by, for example, mixing the rubber-like polymer with the filler such as silica or carbon black described above, a rubber component different from the rubber-like polymer, a silane coupling agent, a rubber softener, a wax, a vulcanizing agent, a vulcanization accelerator, and a vulcanization aid to obtain a rubber composition, and vulcanizing the rubber composition by heating.

The respective components will now be described in detail.

(Rubber-Like Polymer)

The rubber-like polymer used in the rubber composition of the present embodiment is obtained, for example, by copolymerizing at least a conjugated diene monomer and hydrogenating a part of the resultant conjugated diene monomer unit, or by copolymerizing at least ethylene and a conjugated diene monomer.

Thus, a rubber-like polymer containing an ethylene structure and a conjugated diene monomer unit can be obtained.

The rubber-like polymer may contain an aromatic vinyl monomer unit if necessary. In this case, the rubber-like polymer can be obtained by copolymerizing at least a conjugated diene monomer and an aromatic vinyl monomer, and hydrogenating a part of the resultant conjugated diene monomer unit, or by copolymerizing at least ethylene, a conjugated diene monomer, and an aromatic vinyl monomer. The rubber-like polymer may further contain another monomer unit.

In the present embodiment, the term "monomer" refers to a compound before polymerization, and the term "monomer unit" refers to a constitutional unit of a polymer. The term "ethylene structure" embraces both a structure generated by hydrogenating a part of a double bond portion of a conjugated diene monomer unit, and an ethylene monomer unit obtained when ethylene is used as a monomer.

A method for performing hydrogenation after polymerizing a conjugated diene monomer includes a method in which hydrogenation is performed after a conjugated diene monomer is polymerized by anionic polymerization, or copolymerized with an additional monomer if necessary, with various additives under various conditions as described in International Publication No. WO96/05250, Japanese Patent Laid-Open No. 2000-053706, and International Publication Nos. WO2003/085010, WO2019/151126, WO2019/151127, WO2002/002663, and WO2015/006179.

Examples of the conjugated diene monomer includes, but is not limited to, 1,3-butadiene, isoprene, 2,3-dimethyl-1,3-butadiene, 1,3-pentadiene, 3-methyl-1,3-pentadine, 1,3-hexadiene, and 1,3-heptadiene.

Among these, from the viewpoint of industrial availability, 1,3-butadiene and isoprene are preferred, and 1,3-butadiene is more preferred. One of these may be singly used, or two or more of these may be used together.

Examples of the aromatic vinyl monomer include, but is not limited to, styrene, o-methylstyrene, m-methylstyrene, p-methylstyrene, o,p-dimethylstyrene, o-ethylstyrene, m-ethylstyrene, p-ethylstyrene, α-methylstyrene, vinyl ethyl benzene, vinyl xylene, vinyl naphthalene, and diphenylethylene.

Among these, from the viewpoint of industrial availability, styrene is preferred. One of these may be singly used, or two or more of these may be used in combination.

When such a constitutional unit based on an aromatic vinyl monomer is contained in the rubber-like polymer, balance among breaking strength, fuel economy, wet skid resistance, and abrasion resistance of a tire obtained from the rubber composition of the present embodiment tends to be further improved.

Examples of the additional monomer include, but is not limited to, nonconjugated polyene compound monomers such as ethylidene norbornene, dicyclopentadiene, vinyl norbornene, and divinylbenzene; and cyclic nonconjugated polyene compound monomers such as dicyclopentadiene, vinyl norbornene, and ethylidene norbornene.

When such an additional monomer is used, the balance among breaking strength, fuel economy, wet skid resistance, and abrasion resistance obtained when the rubber composition of the present embodiment is used in a tire tends to be further improved.

One of such monomers may be singly used, or two or more of these may be used together.

As a method for copolymerizing at least ethylene and a conjugated diene monomer, for example, methods described in International Publication Nos. WO2019/078083, WO2019/171679, and WO2019/142501 are preferable methods.

In particular, a method in which ethylene and a conjugated diene monomer are copolymerized with an additional monomer added if necessary by coordination polymerization with various additives under various conditions is a preferable method.

<Iodine Value>

The iodine value of the rubber-like polymer is 10 (g/100 g) or more, preferably 15 (g/100 g) or more, more preferably 30 (g/100 g) or more, further preferably 50 (g/100 g) or more, and still further preferably 80 (g/100 g) or more. When the iodine value is 10 (g/100 g) or more, the rubber composition tends to be further improved in processability, ease of crosslinking, and low fuel consumption performance obtained in the form of a tire. In particular, when the iodine value is 80 (g/100 g) or more, processability tends to be further improved, dispersibility of a reinforcing material tends to be further improved, and constant elongation fatigue resistance obtained in the form of a tire tends to be further improved.

On the other hand, the iodine value of the rubber-like polymer is 200 (g/100 g) or less, preferably 170 (g/100 g) or less, more preferably 140 (g/100 g) or less, further preferably 110 (g/100 g) or less, and still further preferably 80 (g/100 g) or less. When the iodine value is 200 (g/100 g) or less, abrasion resistance obtained when the rubber composition is formed into a tire tends to be further improved so that performance change at a later stage of use of the tire can be also suppressed.

The iodine value can be measured in accordance with a method described in "JIS K0070: 1992". The iodine value is a value, in terms of the weight in grams of iodine, corresponding to an amount of halogen reacting with 100 g of a target substance, and hence the iodine value is expressed in the unit of "g/100 g".

The iodine value of the rubber-like polymer can be controlled by adjusting the amount of a double bond contained in the conjugated diene monomer unit.

In a method for producing a rubber-like polymer described below, for example, if a conjugated diene monomer and an aromatic vinyl monomer are copolymerized, the iodine value tends to be lower when the content of the conjugated diene monomer is lower, and alternatively, if a conjugated diene monomer is hydrogenated, the iodine value tends to be lower when a hydrogenation rate is higher.

<Ethylene Structure>

A content of the ethylene structure contained in the rubber-like polymer is 3% by mass or more, preferably 5% by mass or more, and more preferably 20% by mass or more. When the content of the ethylene structure is 3% by mass or more, the rubber composition tends to be excellent in abrasion resistance. The content of the ethylene structure in the rubber-like polymer is preferably 90% by mass or less, 80% by mass or less, and more preferably 70% by mass or less. When the content of the ethylene structure is 90% by mass or less, the rubber composition tends to be further improved in rubber elasticity.

The rubber-like polymer used in the rubber composition of the present embodiment may be produced by subjecting a conjugated diene-based copolymer having an aromatic portion and a conjugated diene portion to a hydrogenation reaction to change a part of a double bond portion included in the conjugated diene portion to an ethylene structure, or may be produced by random copolymerizing an aromatic vinyl monomer, a conjugated diene monomer, and ethylene.

In particular, from the viewpoint of production cost, the rubber-like polymer is obtained preferably by subjecting a conjugated diene-based copolymer to a hydrogenation reaction.

The content of the ethylene structure can be controlled to 3% by mass or more by adjusting an amount of ethylene to be added, or an amount of a conjugated diene monomer unit and a hydrogenation rate thereof.

Herein, a constitutional unit based on an aromatic vinyl monomer is sometimes referred to as an "aromatic portion", and a constitutional unit based on a conjugated diene monomer is sometimes referred to as a "conjugated diene portion".

<Content of Aromatic Vinyl Monomer Block>

A content of the aromatic vinyl monomer block contained in the rubber-like polymer is less than 10% by mass, preferably 7% by mass or less, more preferably 5% by mass or less, and further preferably 3% by mass or less. When the content of the aromatic vinyl monomer block is less than 10% by mass, fuel economy obtained when the rubber composition of the present embodiment is used in a tire tends to be further improved. A lower limit of the content of the aromatic vinyl monomer block is not limited, and can be 1% by mass or more.

It is noted that the term "aromatic vinyl monomer block" refers to a structure including a chain of eight or more aromatic vinyl monomer units.

From the viewpoint of fuel economy obtained when the rubber composition of the present embodiment is used in a tire, the number of such aromatic vinyl monomer blocks in the rubber-like polymer used in the rubber composition of the present embodiment is preferably small or zero.

A method for measuring the content of the aromatic vinyl monomer block in the rubber-like polymer is not especially limited, and for example, when the rubber-like polymer is a butadiene-styrene copolymer, a method in which the butadiene-styrene copolymer is decomposed by Kolthoff method (method described in I. M. KOLTHOFF, et al., J. Polym. Sci. 1, 429 (1946)) to analyze an amount of polystyrene insoluble in methanol can be employed. Another example of the method includes, as described in International Publication No. WO2014-133097, a known method such as measurement of a chain of styrene units by NMR.

The content of the aromatic vinyl monomer block in the rubber-like polymer can be controlled to less than 10% by mass by adjusting, in polymerization process, an amount to be added, and addition timing or the like of the aromatic vinyl monomer.

<Content of Conjugated Diene Monomer Unit>

A content of the conjugated diene monomer unit in the rubber-like polymer is 2% by mass or more, preferably 3% by mass or more, and more preferably 6% by mass or more. A double bond contained in the conjugated diene monomer unit becomes a crosslinkable unsaturated group.

The content of the conjugated diene monomer unit in the rubber-like polymer closely relates to the iodine value. When the content of the conjugated diene monomer unit is 2% by mass or more, the rubber composition of the present embodiment tends to be excellent in processability, ease of crosslinking, and fuel economy obtained in the form of a tire. The content of the conjugated diene monomer unit in the rubber-like polymer is preferably 50% by mass or less, more preferably 30% by mass or less, and further preferably 20% by mass or less. When the content of the conjugated diene monomer unit is 50% by mass or less, abrasion resistance obtained when the rubber composition of the present embodiment is formed into a tire tends to be excellent so that performance change otherwise caused at a later stage of use of the tire can be suppressed.

The content of the conjugated diene monomer unit in the rubber-like polymer can be controlled to fall in the above-described numerical range by adjusting an amount of the conjugated diene monomer to be added in polymerization process.

<Content of Aromatic Vinyl Monomer Unit>

The rubber-like polymer preferably contains an aromatic vinyl monomer unit. A content of the aromatic vinyl monomer unit in the rubber-like polymer is preferably 5% by mass or more, more preferably 7% by mass or more, and further preferably 9% by mass or more. When the content of the aromatic vinyl monomer unit is 5% by mass or more, steering stability obtained when the rubber composition of the present embodiment is used in a tire tends to be excellent.

The content of the aromatic vinyl monomer unit is preferably 40% by mass or less, more preferably 35% by mass or less, and further preferably 30% by mass or less. When the content of the aromatic vinyl monomer unit is 40% by mass or less, fuel economy obtained when the rubber composition of the present embodiment is used in a tire tends to be further improved.

When the content of the aromatic vinyl monomer unit in the rubber-like polymer is 13% by mass or less, fuel economy and abrasion resistance obtained when the rubber composition of the present embodiment is used in a tire tends to be further improved.

The content of the aromatic vinyl monomer unit in the rubber-like polymer can be controlled to fall in the above-described numerical range by adjusting an amount of the aromatic vinyl monomer to be added in polymerization process.

<1,2-Vinyl Bond Content in Conjugated Diene Monomer Unit>

From the viewpoint that brake performance obtained when the rubber composition of the present embodiment is used in a tire is excellent, a 1,2-vinyl bond content in the conjugated diene monomer unit in the rubber-like polymer is preferably 10 mol % or more, more preferably 20 mol % or more, and further preferably 30 mol % or more.

From the viewpoint that fuel economy obtained when the rubber composition of the present embodiment is used in a tire is excellent, the 1,2-vinyl bond content in the conjugated diene monomer unit is preferably 60 mol % or less, more preferably 50 mol % or less, and further preferably 40 mol % or less.

In addition, from the viewpoint that constant elongation fatigue resistance obtained when the rubber composition of the present embodiment is used in a tire is excellent, the 1,2-vinyl bond content in the conjugated diene monomer unit in the rubber-like polymer is preferably 50 mol % or more and 60 mol % or less.

The 1,2-vinyl bond content in the conjugated monomer unit in the rubber-like polymer can be controlled to fall in the above-described numerical range by adjusting an amount of the conjugated diene monomer to be added in polymerization process, and a hydrogenation amount and a reaction time employed in hydrogenation reaction process.

<Content of Rubber-Like Polymer>

Assuming that the total amount of the rubber component including the rubber-like polymer and the natural rubber is 100 parts by mass, the content of the rubber-like polymer in the rubber composition of the present embodiment is 10 parts by mass or more, preferably 20 parts by mass or more, and more preferably 30 parts by mass or more.

When the content of the rubber-like polymer is 10 parts by mass or more, fuel economy and abrasion resistance obtained when the rubber composition of the present embodiment is used in a tire tend to be excellent. From the viewpoint of ensuring excellent processability, the content of the rubber-like polymer is 90 parts by mass or less, preferably 70 parts by mass or less, more preferably 50 parts by mass or less, and further preferably 40 parts by mass or less.

Hereinafter, a value expressed in the unit of "parts by mass" is a value obtained by assuming that the total amount of the rubber component including the rubber-like polymer and the natural rubber is 100 parts by mass unless otherwise stated.

A method for identifying the type and the content rate of a specific rubber component contained in the rubber composition of the present embodiment is not especially limited, and an example includes a method employing NMR.

For example, as previously reported (JSR TECHNICAL REVIEW No. 126/2019), solid state $^{13}$C-C-NMR can be employed for quantitatively calculating a ratio among a styrene unit, a 1,2-vinyl bond, a 1,4-vinyl bond, a 1,4-cis bond, and an isoprene unit contained in a rubber component containing different two or more components.

The different two or more components are not especially limited, and examples include conjugated diene monomer units and aromatic vinyl monomer units incorporated by a bonding mode of a non-hydrogenated 1,2-vinyl bond, a hydrogenated 1,2-vinyl bond, a non-hydrogenated 3,4-vinyl bond, a hydrogenated 3,4-vinyl bond, a non-hydrogenated 1,4-vinyl bond, or a hydrogenated 1,4-vinyl bond. It is noted that the amount of each conjugated diene monomer unit incorporated by each bonding mode can be measured by NMR or the like.

A molar volume and a molar cohesive energy of each of the conjugated diene monomer units and the aromatic vinyl monomer units incorporated by a bonding mode of a non-hydrogenated 1,2-vinyl bond, a hydrogenated 1,2-vinyl bond, a non-hydrogenated 3,4-vinyl bond, a hydrogenated 3,4-vinyl bond, a non-hydrogenated 1,4-vinyl bond, or a hydrogenated 1,4-vinyl bond, and another monomer unit can be obtained, for example, in accordance with a method (Bicerano method) described in J. Bicerano, Prediction of Polymer Properties, 3rd Ed. Marcel Dekker, 2002.

When these are measured as described above, the type and the content rate of a specific rubber component contained in the rubber composition of the present embodiment can be identified.

<Glass Transition Temperature of Rubber-Like Polymer>

The rubber-like polymer used in the rubber composition of the present embodiment has a glass transition temperature of preferably −35° C. or less, more preferably −45° C. or less, and further preferably −50° C. or less.

When the glass transition temperature of the rubber-like polymer falls in the above-described range, abrasion resistance obtained when the rubber composition of the present embodiment is used in a tire tends to be excellent.

The glass transition temperature of the rubber-like polymer can be controlled to fall in the above-described numerical range by adjusting the 1,2-vinyl bond content in the conjugated diene monomer unit, the amount of the aromatic vinyl monomer unit, a hydrogenation rate, and the like.

Specifically, the glass transition temperature of the rubber-like polymer can be reduced by reducing the amount of the aromatic vinyl monomer unit, or reducing the 1,2-vinyl bond content.

An example of a method for setting the glass transition temperature to −35° C. or less includes a method in which the content of the aromatic vinyl monomer unit is set to 5 to 30% by mass and the 1,2-vinyl bond content in the conjugated diene monomer unit is set to 20 to 50% by mass.

The hydrogenation rate also influences the glass transition temperature, but the influence is smaller than those of the 1,2-vinyl bond content and the content of the aromatic vinyl monomer unit. Therefore, for controlling the glass transition temperature, the 1,2-vinyl bond content and/or the content of the aromatic vinyl monomer unit is preferably increased/reduced for the adjustment.

The glass transition temperature of the rubber-like polymer can be measured by specifying a peak top (an inflection point) of a DSC differential curve obtained by recording a DSC curve during temperature increase in a prescribed temperature range in accordance with ISO 22768:2006. Specifically, it can be measured in accordance with a method described in examples below.

A lower limit of the glass transition temperature of the rubber-like polymer is not especially limited, and is preferably −90° C. or more, more preferably −80° C. or more, and further preferably −70° C. or more.

When the glass transition temperature of the rubber-like polymer is −90° C. or more, the rubber composition of the present embodiment tends to be excellent in wet grip performance.

The glass transition temperature of the rubber-like polymer can be controlled to about −90° C. by containing no aromatic vinyl monomer unit in the rubber-like polymer, and adjusting the 1,2-vinyl bond content to 20% or more.

<Containing of Nitrogen Atom>

The rubber-like polymer preferably contains a nitrogen atom from the viewpoint of improvement of fuel economy obtained when the rubber composition of the present embodiment is used in a tire.

A nitrogen atom can be introduced into the rubber-like polymer with a modifier. Dispersibility of a silica-based inorganic filler used as a reinforcing material can be improved in the rubber composition by setting a low hydrogenation rate of the rubber-like polymer, and when the rubber-like polymer is modified with a modifier containing a nitrogen atom, the dispersibility of the silica-based inorganic filler in the rubber composition tends to be further improved.

<Modification Ratio>

From the viewpoint of the dispersibility of the silica-based inorganic filler used as the reinforcing material obtained when the rubber composition of the present embodiment is used in a tire, the modification ratio of the rubber-like polymer is preferably 40% by mass or more. The modification ratio is more preferably 60% by mass or more, and further preferably 70% by mass or more. An upper limit of the modification ratio of the rubber-like polymer is not especially limited, and is preferably 98% by mass or less, more preferably 95% by mass or less, and further preferably 90% by mass or less from the viewpoint that a viscosity of a compound obtained by kneading the rubber composition of the present embodiment is lowered to improve processability.

Herein, the term "modification ratio" refers to a mass ratio of a polymer having a nitrogen atom-containing functional group to the total amount of the rubber-like polymer.

A position where a nitrogen atom is introduced in the rubber-like polymer may be any one of a polymerization starting end, a molecular chain (including a graft), and a polymerization end of the rubber-like polymer.

When the rubber-like polymer is produced by performing hydrogenation after polymerizing a conjugated diene monomer, a method in which a nitrogen atom-containing functional group is introduced into the rubber-like polymer with a coupling agent containing a nitrogen atom is preferably applied from the viewpoints of polymerization productivity, a high modification ratio, and fuel economy obtained when the rubber composition of the present embodiment is used in a tire.

As a coupling agent containing a nitrogen atom, from the viewpoints of polymerization productivity and a high modification ratio, an isocyanate compound, an isothiocyanate compound, an isocyanuric acid derivative, a nitrogen group-containing carbonyl compound, a nitrogen group-containing vinyl compound, a nitrogen group-containing epoxy compound, a nitrogen group-containing alkoxysilane compound and the like are preferred.

From the viewpoint that processability in using the rubber composition of the present embodiment in a tire, the coupling agent preferably has a larger branch number.

The branch number of the coupling agent is not especially limited, and is preferably 3 or more, and more preferably 4 or more from the viewpoint that processability of the rubber composition of the present embodiment is improved. An upper limit of the branch number is not especially limited, and is preferably 30 or less from the viewpoint of productivity.

As the coupling agent containing a nitrogen atom, from the viewpoints of polymerization productivity of the rubber-like polymer, a high modification ratio, and a tensile strength obtained when the rubber composition of the present embodiment is used in a tire, a nitrogen group-containing alkoxysilane compound is more preferred.

Examples of the nitrogen group-containing alkoxysilane compound include, but is not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, 2-ethoxy-2-ethyl-1-(3-diethoxyethylsilylpropyl)-1-aza-2-silacyclopentane, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, tris(4-trimethoxysilylbutyl)amine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and N1-(3-(bis(3-(trimethoxysilyl)propyl)amino)propyl)-N1-methyl-N3-(3-(methyl(3-(trimethoxysilyl)propyl)amino)propyl)-N3-(3-(trimethoxysilyl)propyl)-1,3-propanediamine.

When the rubber-like polymer is produced by copolymerizing ethylene and a conjugated diene monomer, from the viewpoint of fuel economy, abrasion resistance, and flexibility obtained when the rubber composition of the present embodiment is used in a tire, the rubber-like polymer preferably contains a tin atom, a nitrogen atom, or a silicon atom.

As a method for introducing these atoms into the rubber-like polymer, from the viewpoint of productivity, a method in which a coupling agent containing a tin atom, a nitrogen atom, or a silicon atom is used for the introduction when a polymerization reaction reaches 100% is preferably applied.

Examples of the coupling agent containing a tin atom, a nitrogen atom, or a silicon atom include, but are not limited to, a tin-containing compound such as dioctyltin bis(1-octadecyl maleate), an isocyanate compound such as 4,4-diphenylmethane diisocyanate, and an alkoxysilane compound such as glycidylpropyltrimethoxysilane.

<Molecular Weight>

From the viewpoints of shape stability of a molded article of the rubber composition of the present embodiment, and a tensile strength and abrasion resistance of a crosslinked product using the rubber composition, a weight average molecular weight of the rubber-like polymer is preferably 150,000 or more, and more preferably 200,000 or more. On the other hand, from the viewpoint of processability obtained when the rubber composition is formed as a crosslinking rubber composition, the weight average molecular weight is preferably 1,000,000 or less, more preferably 500,000 or less, and further preferably 400,000 or less.

From the viewpoint of fuel economy obtained when the rubber composition of the present embodiment is used in a tire, a molecular weight distribution (=weight average molecular weight/number average molecular weight) of the rubber-like polymer is preferably 2.0 or less, more preferably 1.8 or less, and further preferably 1.6 or less.

On the other hand, from the viewpoint of processability obtained when the rubber composition of the present embodiment is formed as a crosslinking rubber composition, the molecular weight distribution of the rubber-like polymer is preferably 1.05 or more, more preferably 1.2 or more, and further preferably 1.4 or more.

The weight average molecular weight and the molecular weight distribution can be calculated based on a molecular weight, in terms of polystyrene, measured by GC (gel permeation chromatography).

<Deactivating Agent, Neutralizer, Stabilizer, and Rubber Softener>

At a final stage of polymerization process of the rubber-like polymer, a deactivating agent, a neutralizer, and the like may be added if necessary.

Examples of the deactivating agent include, but are not limited to, water; and alcohols such as methanol, ethanol, and isopropanol.

It is noted that the final stage of polymerization process of the rubber-like polymer refers to a state where 95% or more of monomers added have been consumed in the polymerization.

Examples of the neutralizer include, but are not limited to, carboxylic acids such as stearic acid, oleic acid, and versatic acid, namely, a carboxylic acid mixture having 9 to 11 carbon atoms, mainly 10 carbon atoms, and having many branches; and an aqueous solution of an inorganic acid, and carbon dioxide gas.

At the final stage of polymerization process of the rubber-like polymer, a rubber stabilizer is preferably added from the viewpoints of prevention of gel formation and processing stability.

As the rubber stabilizer, any of known stabilizers, not limited to the following, can be used, and antioxidants such as 2,6-di-tert-butyl-4-hydroxytoluene (hereinafter sometimes referred to as "BHT"), n-octadecyl-3-(4'-hydroxy-3', 5'-di-tert-butylphenol)propionate, and 2-methyl-4,6-bis[(octylthio)methyl]phenol are preferred.

At the final stage or the like of polymerization process of the rubber-like polymer, a rubber softener is preferably added if necessary from the viewpoint of improving productivity of the rubber-like polymer, and processability obtained when an inorganic filler or the like is blended in producing a tire using the rubber composition of the present embodiment.

Examples of the rubber softener include, but are not limited to, an extender oil, a liquid rubber, and a ring-containing resin.

A preferable example of a method for adding a rubber softener to the rubber-like polymer includes, but is not limited to, a method in which the rubber softener is added to a solution of the rubber-like polymer to be mixed, and the thus obtained rubber-like polymer solution containing the rubber softener is subjected to desolvation.

Examples of the extender oil include an aromatic oil, a naphthenic oil, and a paraffin oil. Among these, from the viewpoint of environmental safety, and from the viewpoint of oil bleed prevention and wet grip characteristics, an aroma substitute oil containing 3% by mass or less of polycyclic aromatic (PCA) component in accordance with the IP 346 method is preferred. Examples of the aroma substitute oil include TDAE (treated distillate aromatic extracts), MES (mild extraction solvate), and RAE (residual aromatic extracts) described in Kautschunk Gummi Kunststoffe 52 (12) 799 (1999).

A content of the extender oil in the rubber composition of the present embodiment is preferably 10% by mass or less, more preferably 7% by mass or less, and further preferably 5% by mass or less from the viewpoint of suppressing degradation over time caused when the rubber composition is used in a tire.

Examples of the ring-containing resin used as the rubber softener include, but are not limited to, an aromatic petroleum ring-containing resin, a coumarone-indene ring-containing resin, a terpene-based ring-containing resin, a rosin derivative (including a wood oil ring-containing resin), tall oil, a derivative of tall oil, a rosin ester ring-containing resin, a natural or synthetic terpene ring-containing resin, an aliphatic hydrocarbon ring-containing resin, an aromatic hydrocarbon ring-containing resin, a mixed aliphatic/aromatic hydrocarbon ring-containing resin, a coumarin-indene ring-containing resin, a phenol ring-containing resin, a p-tert-butylphenol-acetylene ring-containing resin, a phenol-formaldehyde ring-containing resin, a xylene-formaldehyde ring-containing resin, a monoolefin oligomer, a diolefin oligomer, an aromatic petroleum ring-containing resin, a hydrogenated aromatic hydrocarbon ring-containing resin, a cyclic aliphatic hydrocarbon ring-containing resin, a hydrogenated hydrocarbon ring-containing resin, a hydrocarbon ring-containing resin, a hydrogenated wood oil ring-containing resin, a hydrogenated oil ring-containing resin, and an ester of a hydrogenated oil ring-containing resin and a monofunctional or polyfunctional alcohol.

One of these ring-containing resins may be singly used, or two or more of these may be used together.

When the ring-containing resin is a hydride, all unsaturated groups may be hydrogenated, or some may be left not hydrogenated.

When the ring-containing resin is added to the rubber-like polymer, processability of the rubber composition of the present embodiment tends to be improved, and in addition, breaking strength obtained when the rubber composition is formed into a vulcanizate tends to be improved.

An amount of the extender oil, the liquid rubber or the ring-containing resin to be added as the rubber softener is preferably 35 parts by mass or less, more preferably 20 parts by mass or less, and further preferably 10 parts by mass or less with respect to 100 parts by mass of the total amount of the rubber component including the rubber-like polymer and the natural rubber. When the amount to be added falls in this range, the rubber composition of the present embodiment tends to be excellent in abrasion resistance and fuel economy.

A content of an oil such as the extender oil and/or the ring-containing resin in the rubber composition of the present embodiment is preferably less than 35 parts by mass, more preferably 20 parts by mass or less, and further preferably 10 parts by mass or less with respect to 100 parts by mass of the rubber component including the rubber-like polymer and the natural rubber.

The content of the oil such as the extender oil is preferably less than 10 parts by mass, more preferably 7 parts by mass or less, and further preferably 5 parts by mass or less with respect to 100 parts by mass of the rubber component including the rubber-like polymer and the natural rubber.

When the content falls in this range, the rubber composition of the present embodiment tends to be excellent in abrasion resistance and fuel economy.

The rubber-like polymer contained in the rubber composition of the present embodiment can be obtained by polymerizing a prescribed monomer in a solution, and removing a solvent from the resultant polymer solution to obtain the polymer.

As a method for obtaining the rubber-like polymer from the polymer solution with the solvent removed, any of known methods can be employed. Examples of the methods include a method in which the solvent is separated by steam stripping or the like, and the polymer is then filtered, followed by dehydration and drying to obtain the rubber-like polymer, a method in which the solution is concentrated in a flushing tank, and the resultant is devolatilized with a vent extruder or the like, and a method in which the solution is directly devolatilized with a drum dryer or the like.

(Natural Rubber)

The rubber composition of the present embodiment contains the natural rubber.

In the rubber composition of the present embodiment, assuming that the total amount of the rubber component including the rubber-like polymer and the natural rubber is 100 parts by mass, a content of the natural rubber is 10 parts by mass or more, and preferably 30 parts by mass or more from the viewpoint of abrasion resistance and processability, and more preferably 50 parts by mass or more, and further preferably 60 parts by mass or more from the viewpoint of improving mechanical strength in addition to abrasion resistance and processability.

Besides, from the viewpoints of fuel economy obtained when the rubber composition of the present embodiment is used in a tire and suppression of performance change caused at a later stage of use of the tire, the content of the natural rubber is 90 parts by mass or less, preferably 80 parts by mass or less, and more preferably 70 parts by mass or less.

The natural rubber is not especially limited, and examples include smoked sheets RSS No. 3 to 5, SMR (Standard Malaysian Rubber), and an epoxidized natural rubber from the viewpoints of a large amount of a high molecular weight component, and excellent breaking strength.

The rubber component contained in the rubber composition of the present embodiment may contain an additional rubber in addition to the rubber-like polymer and the natural rubber.

The additional rubber is not especially limited, and can be appropriately selected in accordance with the purposes, and examples include a styrene-butadiene rubber (of emulsion polymerization type or solution polymerization type), polyisoprene, a butadiene rubber (high-cis polybutadiene, low-cis polybutadiene, syndiotactic 1,2-polybutadiene), an acrylonitrile-butadiene rubber (NBR), a chloroprene rubber, an ethylene-α-olefin copolymer rubber such as an ethylene-propylene rubber, an ethylene-butene rubber, or an ethylene-octene rubber, an ethylene-propylene-diene rubber (EPDM), a butyl rubber, a polysulfide rubber, a silicone rubber, a fluororubber, and a urethane rubber.

One of these may be singly used, or a mixture of two or more of these may be used.

For mixing the additional rubber, the additional rubber in a dry state may be mixed after the polymerization of the rubber-like polymer, or the additional rubber in a solution state may be mixed during the polymerization of the rubber-like polymer.

A content of the "additional rubber" is preferably 40 parts by mass or less with respect to 100 parts by mass of the total amount of the rubber-like polymer and the natural rubber from the viewpoint of breaking strength of the rubber composition of the present embodiment. For example, it is supposed that polybutadiene is blended if abrasion resistance is insufficient in using only the rubber-like polymer and the natural rubber, and in this case, an amount of the polybutadiene to be added is preferably 40 parts by mass or less with respect to 100 parts by mass of the total amount of the rubber-like polymer and the natural rubber.

(Silica-Based Inorganic Filler, and Carbon Black)

The rubber composition of the present embodiment contains a silica-based inorganic filler and a carbon black in an amount of 20 parts by mass or more and 80 parts by mass or less with respect to 100 parts by mass of the total amount of the rubber component including the rubber-like polymer and the natural rubber, and the additional rubber used if necessary. The amount is preferably 30 parts by mass or more and 70 parts by mass or less, and more preferably 40 parts by mass or more and 60 parts by mass or less.

(Silica-Based Inorganic Filler)

From the viewpoints of grip performance and steering stability improvement obtained when the rubber composition of the present embodiment is used in a tire, a content of the silica-based inorganic filler in the rubber composition of the present embodiment is 60 parts by mass or less, preferably 58 parts by mass or less, and more preferably 56 parts by mass or less with respect to 100 parts by mass of the total amount of the rubber component including the rubber-like polymer, the natural rubber, and the additional rubber used if necessary.

The silica-based inorganic filler is not especially limited, any of known fillers can be used, a solid particle containing $SiO_2$ or $Si_3Al$ as a constitutional unit is preferred, and a solid particle containing $SiO_2$ or $Si_3Al$ as a principal component of the constitutional unit is more preferred.

Here, the principal component refers to a component contained in the silica-based inorganic filler in a content of 50% by mass or more, preferably 70% by mass or more, and more preferably 80% by mass or more.

Examples of the silica-based inorganic filler include, but are not limited to, inorganic fibrous materials such as silica, cray, talk, mica, diatomite, wollastonite, montmorillonite, zeolite, and glass fiber.

An example of a commercially available product of the silica-based inorganic filler includes one available under a trade name of "Ultrasil 7000GR" manufactured by Evonik Degussa.

Alternatively, a silica-based inorganic filler having a hydrophobized surface, or a mixture of a silica-based inorganic filler and an inorganic filler different from a silica-based filler may be used.

Among these, from the viewpoints of strength and abrasion resistance of the rubber composition of the present embodiment, silica and glass fiber are preferred, and silica is more preferred. Examples of the silica include dry silica, wet silica, and synthetic silicate silica. Among these, wet silica is preferred from the viewpoints of an effect of improving a fracture property of the rubber composition of the present embodiment and excellent balance of wet skid resistance.

From the viewpoint of obtaining practically good abrasion resistance and fracture property in the rubber composition of the present embodiment, a nitrogen adsorption specific surface area (BET specific surface area) obtained by a BET adsorption method of the silica-based inorganic filler is preferably 100 $m^2$/g or more and 300 $m^2$/g or less, and more preferably 170 $m^2$/g or more and 250 $m^2$/g or less. If necessary, a silica-based inorganic filler having a comparatively small specific surface area (of, for example, less than 200 $m^2$/g) and a silica-based inorganic filler having a comparatively large specific surface area (of, for example 200 $m^2$/g or more) can be used in combination. Thus, favorable abrasion resistance and fracture property can be highly balanced with a low hysteresis loss property in the rubber composition of the present embodiment.

It is noted that a nitrogen adsorption specific surface area is obtained in accordance with JIS K 6217-2: 2001.

(Carbon Black)

The rubber composition of the present embodiment further contains a carbon black in addition to the silica-based inorganic filler.

A content of the carbon black is 60 parts by mass or less, preferably 58 parts by mass or less, and more preferably 56 parts by mass or less with respect to 100 parts by mass of the total amount of the rubber component from the viewpoint of improvement of abrasion resistance of the rubber composition of the present embodiment.

A nitrogen adsorption specific surface areas (BET specific surface area) of the carbon black used in the rubber composition of the present embodiment is preferably 5 $m^2$/g or more, more preferably 15 $m^2$/g or more, further preferably 35 $m^2$/g or more, and still further preferably 55 $m^2$/g or more.

When the BET specific surface area of the carbon black is 5 $m^2$/g or more, a sufficient reinforcing effect can be obtained in the rubber composition of the present embodiment, and sufficient rubber breaking strength and steering stability are obtained.

The BET specific surface area of the carbon black is preferably 200 $m^2$/g or less, more preferably 180 m2/g or less, and further preferably 140 m2/g or less. When it is 200 m2/g or less, favorable low fuel consumption performance can be obtained in the rubber composition of the present embodiment.

Besides, the carbon black used in the rubber composition of the present embodiment has dibutyl phthalate oil adsorption (DBP) of preferably 50 mL/100 g or more, more preferably 70 mL/100 g or more, and further preferably 90 mL/100 g or more.

When the DBP of the carbon black is 50 mL/100 g or more, a sufficient reinforcing effect can be obtained in the rubber composition of the present embodiment, and sufficient rubber breaking strength and steering stability are obtained.

The DBP of the carbon black is preferably 200 mL/100 g or less, more preferably 150 mL/100 g or less, and further preferably 110 mL/100 g or less.

When the DBP of the carbon black is 200 mL/100 g or less, excellent low fuel consumption performance tends to be able to be obtained in the rubber composition of the present embodiment.

It is noted that the DBP of the carbon black can be measured in accordance with JIS K 6217-4: 2001.

When the rubber composition of the present embodiment is used in a sidewall of a tire, a carbon black having a nitrogen adsorption specific surface area (BET specific surface area) of 5 to 200 m2/g is preferably contained. A lower limit is more preferably 15 m2/g or more, and further preferably 50 m2/g or more. An upper limit is more preferably 180 m2/g or less, and further preferably 130 m2/g or less, and still further preferably 100 m2/g or less. When the BET specific surface area of the carbon black is 5 m2/g or more, a sufficient reinforcing effect tends to be obtained, and when it is 200 m2/g or less, excellent low fuel consumption performance tends to be obtained.

When the rubber composition of the present embodiment is used in a sidewall of a tire, a content of the carbon black is preferably 30 parts by mass or more, and more preferably 35 parts by mass or more with respect to 100 parts by mass of the total amount of the rubber component. The content is 60 parts by mass or less, more preferably 55 parts by mass or less, and further preferably 50 parts by mass or less.

When the content falls in the above-described range, favorable low fuel consumption performance, chip-cut resistance and constant elongation crack growth resistance are obtained.

A total content of the silica-based inorganic filler and the carbon black in the rubber composition of the present embodiment is 20 parts by mass or more, preferably 30 parts by mass or more, and more preferably 40 parts by mass or more with respect to 100 parts by mass of the total amount of the rubber component from the viewpoint of obtaining practically favorable abrasion resistance and fracture property. From the viewpoint of low fuel consumption performance, the total content is 80 parts by mass or less, preferably 75 parts by mass or less, more preferably 70 parts by mass or less, and further preferably 60 parts by mass or less.

As for a ratio between the silica-based inorganic filler and the carbon black, when low fuel consumption performance is significant, a ratio of the silica-based inorganic filler in the total amount of the silica-based inorganic filler and the carbon black is preferably 60% by mass or more, more preferably 70% by mass or more, and further preferably 80% by mass or more. When abrasion resistance is significant, a ratio of the carbon black in the total amount of the silica-based inorganic filler and the carbon black is preferably 30% by mass or more, more preferably 40% by mass or more, and further preferably 50% by mass or more.

(Metal Oxide and Metal Hydroxide)

The rubber composition of the present embodiment may contain a metal oxide or a metal hydroxide in addition to the silica-based inorganic filler and the carbon black.

The metal oxide refers to a solid particle containing, as a principal component of a constituent unit, a substance represented by chemical formula $MxOy$ (wherein M represents a metal atom, and x and y each independently represent an integer of 1 to 6). Examples include alumina, titanium oxide, magnesium oxide and zinc oxide.

A mixture of a metal oxide and an inorganic filler different from the metal oxide can be used.

The metal hydroxide is not especially limited, and examples include aluminum hydroxide, magnesium hydroxide and zirconium hydroxide.

(Silane Coupling Agent)

The rubber composition of the present embodiment may contain a silane coupling agent.

The silane coupling agent has a group having affinity with or a binding property to each of the rubber component including the rubber-like polymer and the silica-based inorganic filler, and has a function to make close the interaction between the rubber component and the silica-based inorganic filler.

As the silane coupling agent, for example, a compound containing, in one molecule, a sulfur bond portion and alkoxysilyl group and silanol group portions is used.

Examples of the silane coupling agent include, but are not limited to, silane coupling agents having a mercapto group, such as 3-mercaptopropyltrimethoxysilane, 3-mercaptopropylethoxysilane, 2-mercaptoethyltrimethoxysilane, 2-mercaptoethyltriethoxysilane, ethoxy(3-mercaptopropyl)bis(3, 6,9,12,15-pentaoxaoctacosan-1-yloxy)silane [manufactured by Evonik Degussa: Si363], and NXT-Z30, NXT-Z45, NXTZ60 and NXT silane manufactured by Momentive; bis[3-(triethoxysilyl)-propyl]-tetrasulfide, bis[3-(triethoxysilyl)-propyl]-disulfide, bis[2-(triethoxysilyl)-ethyl]-tetrasulfide, bis(3-triethoxysilylpropyl)trisulfide, bis[2-(triethoxysilyl)-ethyl]-tetrasulfide, bis(3-trimethoxysilylpropyl)

tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N, N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylate monosulfide, 3-trimethoxysilylpropylmethacrylate monosulfide, bis (3-diethoxymethylsilylpropyl)tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazolyltetrasulfide.

Among the above-described silane coupling agents, from the viewpoint of a high reinforcing effect of the rubber composition of the present embodiment, bis-[3-(triethoxysilyl)-propyl]-disulfide; silane coupling agents having a mercapto group, such as ethoxy(3-mercaptopropyl)bis(3,6,9,12, 15-pentaoxaoctacosan-1-yloxy)silane [manufactured by Evonik Degussa: Si363], and NXT-Z30, NXT-Z45, NXTZ60 and NXT silane manufactured by Momentive; and bis[3-(triethoxysilyl)-propyl]-tetrasulfide are preferred.

One of these silane coupling agents may be singly used, or two or more of these may be used in combination.

An amount of the silane coupling agent to be blended in the rubber composition of the present embodiment is, from the viewpoint of further remarkably obtaining the effect of making close the interaction between the rubber component and the silica-based inorganic filler in the rubber component and the silica-based inorganic filler, preferably 0.1 parts by mass or more, more preferably 0.5 parts by mass or more, and further preferably 1 part by mass or more with respect to 100 parts by mass of the total amount of the rubber component including the rubber-like polymer and the natural rubber. From the viewpoint of obtaining favorable processability of the rubber composition of the present embodiment, the amount of the silane coupling agent to be blended is preferably 30 parts by mass or less, more preferably 20 parts by mass or less, and further preferably 15 parts by mass or less.

(Rubber Softener)

The rubber composition of the present embodiment may contain a rubber softener from the viewpoint of improving processability.

As the rubber softener, for example, a mineral oil-based rubber softener, or a liquid or low molecular weight synthetic softener is suitably used.

The mineral oil-based rubber softener, which is also designated as a process oil or an extender oil, is used for softening, expanding and improving processability of a rubber. The mineral oil-based rubber softener is a mixture of an aromatic ring, a naphthene ring and a paraffin chain, and one in which the number of carbon atoms of the paraffin chain is 50% or more of the number of all carbon atoms is designated as a paraffin-based softener, one in which the number of carbon atoms of the naphthene ring is 30% to 45% is designated as a naphthene-based softener, and one in which the number of carbon atoms of the aromatic ring exceeds 30% is designated as an aromatic-based softener. As the rubber softener, one having an appropriate number of carbon atoms of the aromatic ring is preferred because such a softener tends to have high affinity with the rubber-like polymer.

From the viewpoint that occurrence of bleeding out is suppressed to prevent the rubber composition from becoming hard over time, the amount of the rubber softener to be blended is preferably 10 parts by mass or less, more preferably 7 parts by mass or less, and further preferably 5 parts by mass or less with respect to 100 parts by mass of the total amount of the rubber component including the rubber-like polymer and the natural rubber.

[Method for Producing Rubber Composition]

The rubber composition of the present embodiment can be produced by mixing the constituent materials, such as the rubber component including the rubber-like polymer and the natural rubber, the silica-based inorganic filler, the carbon black, and an additional filler if necessary, and additives such as the silane coupling agent and the rubber softener.

Examples of a mixing method include, but are not limited to, a melt kneading method using a general mixer such as an open roll, a Banbury mixer, a kneader, a single screw extruder, a double screw extruder, or a multi-screw extruder, and a method in which the respective components are dissolved to be mixed, and then a solvent is removed by heating.

Among these, a melt kneading method using an open roll, a Banbury mixer, a kneader or an extruder is preferred from the viewpoints of productivity and good kneadability. Either of a method in which the constituent materials of the rubber composition of the present embodiment are kneaded all at once, and a method in which the materials are mixed dividedly plural times can be employed.

The rubber composition of the present embodiment may be obtained as a vulcanized composition through vulcanization treatment with a vulcanizing agent.

Examples of the vulcanizing agent include, but are not limited to, a radical generator such as an organic peroxide or an azo compound, an oxime compound, a nitroso compound, a polyamine compound, sulfur, and a sulfur compound.

The sulfur compound encompasses sulfur monochloride, sulfur dichloride, a disulfide compound, and a polymer polysulfur compound.

A content of the vulcanizing agent is, from the viewpoint of improvement of breaking strength through the reinforcing effect, preferably 0.01 parts by mass or more, more preferably 0.1 parts by mass or more, and further preferably 1 part by mass or more with respect to 100 parts by mass of the total amount of the rubber component including the rubber-like polymer and the natural rubber. From the viewpoints of obtaining flexibility and improving elongation at break, the content of the vulcanizing agent is preferably 20 parts by mass or less, more preferably 15 parts by mass or less, and further preferably 10 parts by mass or less.

As a vulcanization method, any of conventionally known methods can be applied, and a vulcanization temperature is not especially limited, and is preferably 120° C. or more, more preferably 135° C. or more, and further preferably 140° C. or more from the viewpoint that vulcanization time can be reduced to improve production efficiency. From the viewpoint of suppressing thermal deterioration caused in vulcanization, the vulcanization temperature is preferably 200° C. or less, more preferably 160° C. or less, and further preferably 150° C. or less.

A vulcanization accelerator may be used in vulcanization if necessary.

As the vulcanization accelerator, any of conventionally known materials can be used, and examples include, but are not limited to, vulcanization accelerators such as a sulfenamide-based compound, a guanidine-based compound, a thiuram-based compound, an aldehyde-amine-based compound, an aldehyde-ammonia-based compound, a thiazolebased compound, a thiourea-based compound, and a dithiocarbamate-based compound.

Examples of a vulcanization aid include, but are not limited to, zinc powder and stearic acid.

A content of the vulcanization accelerator is preferably 0.01 parts by mass or more and 20 parts by mass or less, and more preferably 0.1 parts by mass or more and 15 parts by mass or less with respect to 100 parts by mass of the total amount of the rubber component including the rubber-like polymer and the natural rubber.

In the rubber composition of the present embodiment, various additives, such as an additional softener, a filler, a heat stabilizer, an antistatic agent, a weathering stabilizer, an anti-aging agent, a colorant, and a lubricant, may be used in addition to the above-described constituent materials as long as the objects of the present invention are not impaired.

As the additional softener, any of known softeners can be used. Examples of the additional filler include calcium carbonate, magnesium carbonate, aluminum sulfate, and barium sulfate.

As the heat stabilizer, the antistatic agent, the weathering stabilizer, the anti-aging agent, the colorant, and the lubricant, any of known materials can be respectively used.

[Preferable Physical Properties of Rubber Composition]

In the rubber composition of the present embodiment, it is preferable that the iodine value (A) of the rubber-like polymer, the content (in parts by mass) (B) of the silica-based inorganic filler and the content (in parts by mass) (C) of the carbon black with respect to 100 parts by mass of the total amount of the rubber component, the BET specific surface area (D) of the silica-based inorganic filler, and the BET specific surface area (E) of the carbon black have a relationship of the following expression (1):

$$0 < (0.029 \times ((B) \times (D)) + ((C) \times (E))) - (A) < 250 \qquad \text{Expression (1):}$$

The expression (1) indicates balance between abrasion resistance owing to the reinforcing effect of the filler obtained in the rubber composition of the present embodiment and processability of the rubber composition, and when a resultant value is larger than 0 and smaller than 250, a rubber composition excellent in abrasion resistance and processability is obtained.

The range of the value is more preferably 10 or more and 200 or less, and further preferably 50 or more and 150 or less.

In the rubber composition of the present embodiment, it is preferable that the iodine value (A) of the rubber-like polymer, the content (in parts by mass) (B) of the silica-based inorganic filler and the content (in parts by mass) (C) of the carbon black with respect to 100 parts by mass of the total amount of the rubber component, the BET specific surface area (D) of the silica-based inorganic filler, and the BET specific surface area (E) of the carbon black have a relationship of the following expression (2):

$$0 < (0.029 \times ((B) \times (D)) + ((C) \times (E))) - (A) < 136. \qquad \text{Expression (2):}$$

When a value of the expression (2) is larger than 0 and smaller than 136, a rubber composition excellent in abrasion resistance, processability, and constant elongation fatigue resistance is obtained.

The range of the value is more preferably 10 or more and 126 or less, and further preferably 50 or more and 100 or less.

[Tire]

The rubber composition of the present embodiment is suitably used as a rubber composition for a tire of a heavy-load vehicle.

In other words, a tire of the present embodiment contains the rubber composition of the present embodiment in a cap tread portion.

A load index of JATMA standard, corresponding to load bearing of a tire of a heavy-load vehicle, is preferably 100 or more, more preferably 110 or more, and further preferably 120 or more from the viewpoint of load bearing.

A tire of a heavy-load vehicle is used under severe conditions for abrasion, and hence requires to be excellent in abrasion resistance.

In addition, a tire is demanded to have low fuel consumption performance in consideration of environmental load and operating cost. Accordingly, from the viewpoints of abrasion resistance and low fuel consumption performance, it is preferable that the rubber composition of the present embodiment contains the natural rubber having a low glass transition temperature, and uses, as the rubber-like polymer, polybutadiene and styrene butadiene block copolymer having a lower glass transition point. Besides, from the viewpoint of abrasion resistance, the amount of an extender oil to be blended in the rubber composition of the present embodiment is preferably smaller.

As described so far, in the present embodiment, a rubber composition that is excellent in abrasion resistance, and excellent in processability and low fuel consumption performance, and with which an excellent tire capable of also suppressing performance change caused at a later stage of use of the tire is obtained can be provided.

The rubber composition of the present embodiment can be used in, although not limited to, various tires such as a fuel efficient tire, an all-season tire, and a studless tire; and various portions of a tire such as a tread, a carcass, a sidewall, and a bead portion.

In particular, the rubber composition of the present embodiment is excellent in low fuel consumption performance and abrasion resistance obtained when formed into a vulcanizate, and can suppress performance change otherwise caused at a later stage of use of a tire, and therefore, is more suitably used in a tread of a fuel efficient tire, an all-season tire, or a snow tire of a heavy-load vehicle.

EXAMPLES

Now, the present embodiment will be more specifically described with reference to specific examples and comparative examples, and it is noted that the present embodiment is not limited to the following examples and comparative examples at all.

Various physical properties of the examples and comparative examples were measured by the following methods.
(Weight Average Molecular Weight (Mw) of Rubber-like Polymer)

A chromatogram was measured with a GPC measuring apparatus including a series of three columns using a polystyrene-based gel as a filler, and a weight average molecular weight (Mw) of the rubber-like polymer was obtained based on a calibration curve obtained using standard polystyrene.

Specific measurement conditions are described below.

The measurement was performed with 20 μL of the following measurement solution injected into the GPC measuring apparatus.
<Measurement Conditions>
    Apparatus: trade name "HLC-8320GPC" manufactured by Tosoh Corporation
    Eluent: tetrahydrofuran (THF) containing 5 mmol/L of triethylamine Guard column: trade name "TSKguardcolumn Super H-H" manufactured by Tosoh Corporation
    Separation columns: trade names "TSKgel Super H5000", "TSKgel Super H6000", and "TSKgel Super H7000" manufactured by Tosoh Corporation in series in the stated order
    Oven temperature: 40° C.
    Flow rate: 0.6 ml/min
    Detector: RI detector (trade name "HLC8020" manufactured by Tosoh Corporation)
    Measurement solution: measurement solution obtained by dissolving 10 mg of a measurement sample in 20 mL of THF
(Mooney Viscosities of Rubber-like Polymer and Rubber Composition)

A Mooney viscosity of the rubber-like polymer and the rubber composition was measured with a Mooney viscometer (trade name "VR1132" manufactured by Ueshima Seisakusho Co., Ltd.) using an L rotor in accordance with ISO 289.

A sample was first preheated for 1 minute at 100° C., the rotor was rotated at 2 rpm, and torque was measured after 4 minutes to be defined as a Mooney viscosity ($ML_{(1+4)}$) at 100° C.
(Modification Ratio of Rubber-like Polymer)

The modification ratio of each rubber-like polymer was measured by column adsorption GPC as follows by utilizing a characteristic that a modified rubber-like polymer adsorbs on a column.

A sample solution containing a sample and low molecular weight internal standard polystyrene was measured for an amount of adsorption to a silica-based column based on a difference between a chromatogram measured with a column filled with a polystyrene-based gel and a chromatogram measured with a column filled with a silica-based gel, and thus, a modification ratio was obtained.

GPC measurement conditions using a polystyrene-based column were as follows.

The measurement was performed with 20 μl of the following measurement solution injected into a GPC measuring apparatus.
<GPC Measurement Conditions Using Polystyrene-Based Column>
    Apparatus: trade name "HLC-8320GPC" manufactured by Tosoh Corporation
    Eluent: THF containing 5 mmol/L of triethylamine
    Guard column: trade name "TSKguardcolumn Super H-H" manufactured by Tosoh Corporation
    Separation columns: trade names "TSKgel Super H5000", "TSKgel Super H6000", and "TSKgel Super H7000" manufactured by Tosoh Corporation in series in the stated order
    Oven temperature: 40° C.
    Flow rate: 0.6 ml/min
    Detector: RI detector (trade name "HLC8020" manufactured by Tosoh Corporation)
    Measurement solution: measurement solution obtained by dissolving 10 mg of a sample and 5 mg of standard polystyrene in 20 mL of THF GPC measurement conditions using a silica-based column were as follows.

The measurement was performed with 50 μl of the following measurement solution injected into a GPC measuring apparatus.

<GPC Measurement Conditions Using Silica-Based Column>

Apparatus: trade name "HLC-8320GPC" manufactured by Tosoh Corporation

Eluent: THF

Guard column: trade name "DIOL 4.6×12.5 mm 5 micron" manufactured by GL Sciences Inc.

Separation columns: trade names "Zorbax PSM-1000S", "PSM-3005", and "PSM-60S" manufactured by Agilent Technologies Japan, Ltd. in series in the stated order Oven temperature: 40° C.

Flow rate: 0.5 ml/min

Detector: RI detector (trade name "HLC8020" manufactured by Tosoh Corporation)

Calculation Method for Modification Ratio:

A modification ratio (%) was obtained in accordance with the following equation assuming that a whole peak area of the chromatogram obtained with the polystyrene-based column is 100, that a peak area of the sample is P1, that a peak area of the standard polystyrene is P2, that a whole peak area of the chromatogram obtained with the silica-based column is 100, that a peak area of the sample is P3, and that a peak area of the standard polystyrene is P4:

$$\text{Modification ratio } (\%) = [1 - (P2 \times P3)/(P1 \times P4)] \times 100$$

wherein P1+P2=P3+P4=100.

(Amount of Bound Styrene in Rubber-Like Polymer)

A measurement sample was obtained by dissolving 100 mg of a sample in 100 mL of chloroform.

An amount of adsorption by a phenyl group of styrene at an ultraviolet adsorption wavelength (about 254 nm) was used to measure an amount of bound styrene (% by mass) with respect to 100% by mass of each rubber-like polymer used as the sample.

As a measuring apparatus, a spectrophotometer "UV-2450" manufactured by Shimadzu Corporation was used.

(Microstructure of Butadiene Portion (1,2-Vinyl Bond Content) of Rubber-Like Polymer)

A measurement sample was obtained by dissolving 50 mg of a sample in 10 mL of carbon disulfide.

An infrared spectrum was measured in a range of 600 to 1000 cm$^{-1}$ with a solution cell used, and based on an absorbance at a prescribed wavelength, a microstructure of a butadiene portion, namely, a 1,2-vinyl bond content (mol %), was obtained in accordance with an equation of Hampton's method (a method described in R. R. Hampton, Analytical Chemistry 21, 923 (1949)).

As a measuring apparatus, a Fourier transform infrared spectrophotometer "FT-IR230" manufactured by JASCO Corporation was used.

(Hydrogenation Rate, Ethylene Structure, and Conjugated Diene Monomer Unit of Rubber-Like Polymer)

An integrated value of an unsaturated bond portion of a polymer before hydrogenation was obtained by $^1$H-NMR measurement.

Subsequently, a large amount of methanol was added to a reaction solution obtained after hydrogenation to precipitate and collect a hydrogenated conjugated diene-based polymer (a rubber-like polymer).

Then, the hydrogenated conjugated diene-based polymer was extracted with acetone, and the hydrogenated conjugated diene-based polymer was vacuum dried.

The resultant was used as a sample for the $^1$H-NMR measurement to measure a hydrogenation rate, an ethylene structure, and a conjugated diene monomer unit. Conditions for the $^1$H-NMR measurement were as follows.

(Measurement Conditions)

Measuring apparatus: JNM-LA400 (manufactured by JEOL Ltd.)

Solvent: deuterated chloroform

Measurement sample: substance sampled before or after hydrogenation of polymer

Sample concentration: 50 mg/mL

Observation frequency: 400 MHz

Chemical shift reference: TMS (tetramethylsilane)

Pulse delay: 2.904 sec

Number of scans: 64

Pulse width: 45°

Measurement temperature: 26° C.

(Content of Styrene Block in Rubber-Like Polymer)

Assuming that a chain of eight or more styrene structure units is defined as a styrene block, and the content was obtained as follows.

Based on a $^1$H-NMR spectrum at 400 MHz measured with deuterated chloroform used as a solvent, a ratio of an integrated value of the following (X) in each chemical shift range was obtained, and thus, the content of the styrene block contained in the rubber-like block polymer was obtained.

(X) Chain of eight or more aromatic vinyl compounds: $6.00 \le X < 6.68$ (Iodine Value of Rubber-Like Polymer)

The iodine value of each rubber-like polymer was calculated in accordance with a method described in "JIS K 0070: 1992".

(Glass Transition Temperature (Tg) of Rubber-Like Polymer)

Each rubber-like polymer was used as a sample to record a DSC curve with a differential scanning calorimeter "DSC3200S" manufactured by Mac Science in accordance with ISO 22768: 2006 under a flow of helium at 50 mL/min with a temperature increased from −100° C. at a rate of 20° C./min, and a peak top (infection point) of the thus obtained DSC differential curve was defined as the glass transition temperature.

Production of Rubber-Like Polymer (Production Example 1) Rubber-Like Polymer (A) Before Hydrogenation A temperature-controllable autoclave having an internal capacity of 40 L and equipped with a stirrer and a jacket was used as a reactor. The reactor was charged with 2,160 g of 1,3-butadiene, from which impurities had been precedently removed, 300 g of styrene, 21,000 g of cyclohexane, and 30 mmol of tetrahydrofuran (THF) and 4.9 mmol of 2,2-bis(2-oxolanyl)propane used as polar substances, and the internal temperature of the reactor was kept at 42° C. As a polymerization initiator, 33.2 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 76° C. Two minutes after reaching this reaction temperature peak, 6.6 mmol of 2,2-dimethoxy-1-(3-trimethoxysilylpropyl)-1-aza-2-silacyclopentane (compound 1) was added to the reactor to perform a coupling reaction for 20 minutes, and a polymer solution was thus obtained. To the thus obtained polymer solution, 6.0 mmol of methanol used as a reaction terminator was added to obtain a rubber-like polymer solution (A-1).

A portion of the conjugated diene-based polymer solution was extracted to be desolvated with a dryer, and thus, a rubber-like polymer (A) before hydrogenation was obtained.

Analysis results are shown in Table 1.

(Production Example 2) Rubber-Like Polymer (B) Before Hydrogenation

A temperature-controllable autoclave having an internal capacity of 40 L and equipped with a stirrer and a jacket was used as a reactor. The reactor was charged with 2,100 g of 1,3-butadiene, from which impurities had been precedently removed, 780 g of styrene, 21,000 g of cyclohexane, and 30 mmol of tetrahydrofuran (THF) and 18.3 mmol of 2,2-bis(2-oxolanyl)propane used as polar substances, and the internal temperature of the reactor was kept at 42° C. As a polymerization initiator, 26.2 mmol of n-butyllithium was supplied to the reactor.

After starting a polymerization reaction, the temperature within the reactor started to increase due to heat generation through polymerization, and after monomer conversion within the reactor reached 98%, 120 g of 1,3-butadiene was added to cause a reaction.

The temperature within the reactor finally reached 78° C. Two minutes after reaching this reaction temperature peak, 5.2 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 4.7 mmol of methanol used as a reaction terminator was added to obtain a rubber-like polymer solution (B-1). A portion of the conjugated diene-based polymer solution was extracted to be desolvated with a dryer, and thus, a rubber-like polymer (B) before hydrogenation was obtained.

(Production Example 3) Rubber-Like Polymer (C) Before Hydrogenation

A rubber-like polymer solution (C-1) was obtained in the same manner as in Production Example 1 except that 2,2-dimethoxy-1-(3-trimethoxysilylpropyl)-1-aza-2-silacyclopentane (compound 1) was changed to tetraglycidyl-1,3-bisaminomethylcyclohexane (compound 2). A portion of the conjugated diene-based polymer solution was extracted to be desolvated with a dryer, and thus, a rubber-like polymer (C) before hydrogenation was obtained.

(Production Example 4) Rubber-Like Polymer (D) Before Hydrogenation

A rubber-like polymer solution (D-1) was obtained in the same manner as in Production Example 1 except that the amount of 2,2-dimethoxy-1-(3-trimethoxysilylpropyl)-1-aza-2-silacyclopentane (compound 1) added was changed to 3.9 mmol. A portion of the conjugated diene-based polymer solution was extracted to be desolvated with a dryer, and thus, a rubber-like polymer (D) before hydrogenation was obtained.

(Production Example 5) Rubber-Like Polymer (E) Before Hydrogenation

A temperature-controllable autoclave having an internal capacity of 40 L and equipped with a stirrer and a jacket was used as a reactor, and was charged with 1,680 g of 1,3-butadiene, from which impurities had been precedently removed, 780 g of styrene, 21,000 g of cyclohexane, and 50 mmol of tetrahydrofuran (THF) and 8.2 mmol of 2,2-bis(2-oxolanyl)propane used as polar substances, and the temperature within the reactor was kept at 42° C. As a polymerization initiator, 33.2 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 76° C. Two minutes after reaching this reaction temperature peak, 6.6 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 6.0 mmol of methanol used as a reaction terminator was added to obtain a rubber-like polymer solution (E-1). A portion of the conjugated diene-based polymer solution was extracted to be desolvated with a dryer, and thus, a rubber-like polymer (E) before hydrogenation was obtained.

(Production Example 6) Rubber-Like Polymer (F) Before Hydrogenation

A temperature-controllable autoclave having an internal capacity of 40 L and equipped with a stirrer and a jacket was used as a reactor, and was charged with 3,000 g of 1,3-butadiene, from which impurities had been precedently removed, 21,000 g of cyclohexane, and 50 mmol of tetrahydrofuran (THF) and 6.7 mmol of 2,2-bis(2-oxolanyl)propane used as polar substances, and the temperature within the reactor was kept at 40° C. As a polymerization initiator, 45.0 mmol of n-butyllithium was supplied to the reactor.

After starting a polymerization reaction, the temperature within the reactor started to increase due to heat generation through polymerization, and the temperature within the reactor finally reached 79° C. Two minutes after reaching this reaction temperature peak, 8.0 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 12.6 mmol of methanol used as a reaction terminator was added to obtain a rubber-like polymer solution (F-1). A portion of the conjugated diene-based polymer solution was extracted to be desolvated with a dryer, and thus, a rubber-like polymer (F) before hydrogenation was obtained.

(Production Example 7) Rubber-Like Polymer (G) Before Hydrogenation

A temperature-controllable autoclave having an internal capacity of 40 L and equipped with a stirrer and a jacket was used as a reactor, and was charged with 1,680 g of 1,3-butadiene, from which impurities had been precedently removed, 780 g of styrene, 21,000 g of cyclohexane, and 50 mmol of tetrahydrofuran (THF) and 5.7 mmol of 2,2-bis(2-oxolanyl)propane used as polar substances, and the temperature within the reactor was kept at 42° C. As a polymerization initiator, 31.9 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 79° C. Two minutes after reaching this reaction temperature peak, 6.4 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 6.1 mmol of methanol used as a reaction terminator was added to obtain a rubber-like polymer solution (G-1). A portion of the conjugated diene-based polymer solution was extracted to be desolvated with a dryer, and thus, a rubber-like polymer (G) before hydrogenation was obtained.

(Production Example 8) Rubber-Like Polymer (H) Before Hydrogenation

A temperature-controllable autoclave having an internal capacity of 40 L and equipped with a stirrer and a jacket was used as a reactor, and was charged with 2,100 g of 1,3-butadiene, from which impurities had been precedently removed, 360 g of styrene, 21,000 g of cyclohexane, and 50 mmol of tetrahydrofuran (THF) and 29.5 mmol of 2,2-bis(2-oxolanyl)propane used as polar substances, and the temperature within the reactor was kept at 40° C. As a polymerization initiator, 34.7 mmol of n-butyllithium was supplied to the reactor.

After starting a polymerization reaction, the temperature within the reactor started to increase due to heat generation through polymerization, and after monomer conversion within the reactor reached 98%, 540 g of 1,3-butadiene was added to cause a reaction.

The temperature within the reactor finally reached 76° C. Two minutes after reaching this reaction temperature peak, 6.9 mmol of 2,2-dimethoxy-1-(3-trimethoxysilylpropyl)-1-aza-2-silacyclopentane (compound 1) was added to the reactor to perform a coupling reaction for 20 minutes. To the thus obtained polymer solution, 6.6 mmol of methanol used as a reaction terminator was added to obtain a rubber-like polymer solution (H-1). A portion of the conjugated diene-based polymer solution was extracted to be desolvated with a dryer, and thus, a rubber-like polymer (H) before hydrogenation was obtained.
(Preparation of Hydrogenation Catalyst (TC1))

A nitrogen-purged reactor was charged with 1 L of dried and purified cyclohexane, and 100 mmol of bis(η5-cyclopentadienyl)titanium dichloride was added thereto. Under sufficient stirring, a n-hexane solution containing 200 mmol of trimethyl aluminum was added thereto to be reacted for about 3 days at room temperature, and thus, a hydrogenation catalyst (TC1) was obtained.

(Production Example 9) Rubber-Like Polymer (AH1)

To the rubber-like polymer solution (A-1) before hydrogenation obtained in Production Example 1, the hydrogenation catalyst (TC1) was added in an amount, in terms of Ti, of 60 ppm per 100 parts by mass of the rubber-like polymer before hydrogenation, followed by a hydrogenation reaction at a hydrogen pressure of 0.8 MPa and an average temperature of 85° C. for 50 minutes. To the thus obtained solution of the rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, the resultant rubber-like polymer solution was added in a dropwise manner to hot water to remove the solvent, and the resultant was subjected to a drying treatment with a dryer to obtain a rubber-like polymer (AH1).

(Production Example 10) Rubber-Like Polymer (AH2)

A rubber-like polymer (AH2) was obtained in the same manner as in (Production Example 9) except that the amount of the hydrogenation catalyst (TC1) added was changed to 70 ppm, in terms of Ti, per 100 parts by mass of the rubber-like polymer before hydrogenation.

(Production Example 11) Rubber-Like Polymer (AH3)

A rubber-like polymer (AH3) was obtained in the same manner as in (Production Example 9) except that the amount of the hydrogenation catalyst (TC1) added was changed to 74 ppm, in terms of Ti, per 100 parts by mass of the rubber-like polymer before hydrogenation.

(Production Example 12) Rubber-Like Polymer (AH4)

A rubber-like polymer (AH3) was obtained in the same manner as in (Production Example 9) except that the amount of the hydrogenation catalyst (TC1) added was changed to 80 ppm, in terms of Ti, per 100 parts by mass of the rubber-like polymer before hydrogenation.

(Production Example 13) Rubber-Like Polymer (BH1)

To the rubber-like polymer solution (B-1) before hydrogenation obtained in (Production Example 2), the hydrogenation catalyst (TC1) was added in an amount, in terms of Ti, of 85 ppm per 100 parts by mass of the rubber-like polymer before hydrogenation, followed by a hydrogenation reaction at a hydrogen pressure of 0.8 MPa and an average temperature of 85° C. for 50 minutes. To the thus obtained solution of the rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, the resultant rubber-like polymer solution was added in a dropwise manner to hot water to remove the solvent, and the resultant was subjected to a drying treatment with a dryer to obtain a rubber-like polymer (BH1).

(Production Example 14) Rubber-Like Polymer (CH1)

To the rubber-like polymer solution (C-1) before hydrogenation obtained in Production Example 3, the hydrogenation catalyst (TC1) was added in an amount, in terms of Ti, of 70 ppm per 100 parts by mass of the rubber-like polymer before hydrogenation, followed by a hydrogenation reaction at a hydrogen pressure of 0.8 MPa and an average temperature of 85° C. for 50 minutes. To the thus obtained solution of the rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, the resultant rubber-like polymer solution was added in a dropwise manner to hot water to remove the solvent, and the resultant was subjected to a drying treatment with a dryer to obtain a rubber-like polymer (CH1).

(Production Example 15) Rubber-Like Polymer (DH1)

To the rubber-like polymer solution (D-1) before hydrogenation obtained in Production Example 4, the hydrogenation catalyst (TC1) was added in an amount, in terms of Ti, of 60 ppm per 100 parts by mass of the rubber-like polymer before hydrogenation, followed by a hydrogenation reaction at a hydrogen pressure of 0.8 MPa and an average temperature of 85° C. for 50 minutes. To the thus obtained solution of the rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, the resultant rubber-like polymer solution was added in a dropwise manner to hot water to remove the solvent, and the resultant was subjected to a drying treatment with a dryer to obtain a rubber-like polymer (DH1).

(Production Example 16) Rubber-Like Polymer (EH1)

To the rubber-like polymer solution (E-1) before hydrogenation obtained in Production Example 5, the hydrogenation catalyst (TC1) was added in an amount, in terms of Ti, of 60 ppm per 100 parts by mass of the rubber-like polymer before hydrogenation, followed by a hydrogenation reaction at a hydrogen pressure of 0.8 MPa and an average temperature of 85° C. for 50 minutes. To the thus obtained solution of the rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, the resultant rubber-like polymer solution was added in a dropwise manner to hot water to remove the solvent, and the resultant was subjected to a drying treatment with a dryer to obtain a rubber-like polymer (EH1).

(Production Example 17) Rubber-Like Polymer (FH1)

To the rubber-like polymer solution (F-1) before hydrogenation obtained in Production Example 6, the hydrogenation catalyst (TC1) was added in an amount, in terms of Ti, of 60 ppm per 100 parts by mass of the rubber-like polymer before hydrogenation, followed by a hydrogenation reaction at a hydrogen pressure of 0.8 MPa and an average temperature of 85° C. for 60 minutes. To the thus obtained solution of the rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, the resultant rubber-like polymer solution was added in a dropwise manner to hot water to remove the solvent, and the resultant was subjected to a drying treatment with a dryer to obtain a rubber-like polymer (FH1).

(Production Example 18) Rubber-Like Polymer (GH1)

To the rubber-like polymer solution (G-1) before hydrogenation obtained in (Production Example 7), the hydrogenation catalyst (TC1) was added in an amount, in terms of Ti, of 60 ppm per 100 parts by mass of the rubber-like polymer before hydrogenation, followed by a hydrogenation reaction at a hydrogen pressure of 0.8 MPa and an average temperature of 85° C. for 80 minutes. To the thus obtained solution of the rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, the resultant rubber composition solution was added in a dropwise manner to hot water to remove the solvent, and the resultant was subjected to a drying treatment with a dryer to obtain a rubber-like polymer (GH1).

(Production Example 19) Rubber-Like Polymer (HH1)

To the rubber-like polymer solution (H-1) before hydrogenation obtained in (Production Example 8), the hydrogenation catalyst (TC1) was added in an amount, in terms of Ti, of 60 ppm per 100 parts by mass of the rubber-like polymer before hydrogenation, followed by a hydrogenation reaction at a hydrogen pressure of 0.8 MPa and an average temperature of 90° C. for 60 minutes. To the thus obtained solution of the rubber-like polymer, 12.6 g of n-octadecyl-3-(3,5-di-t-butyl-4-hydroxyphenyl)-propionate and 3.0 g of 4,6-bis(octylthiomethyl)-o-cresol were added as antioxidants, the resultant rubber composition solution was added in a dropwise manner to hot water to remove the solvent, and the resultant was subjected to a drying treatment with a dryer to obtain a rubber-like polymer (HH1).

TABLE 1

| | | A | AH1 | AH2 | AH3 | AH4 | BH1 | CH1 | DH1 | EH1 | FH1 | GH1 | HH1 |
|---|---|---|---|---|---|---|---|---|---|---|---|---|---|
| Weight Average Molecular Weight ($\times 10^4$) | | 35 | 35 | 35 | 35 | 35 | 31 | 35 | 35 | 31 | 35 | 35 | 35 |
| Mooney Viscosity | [ML(1 + 4)] @100° C. | 45 | 67 | 73 | 76 | 86 | 55 | 73 | 67 | 50 | 67 | 64 | 64 |
| Hydrogenation Rate | [mol % in Bd] | 0 | 75 | 90 | 95 | 100 | 95.5 | 85 | 75 | 85 | 70 | 75 | 65 |
| Iodine Value | [l g/100 g] | 423.5 | 105.9 | 42.3 | 21.0 | 0.0 | 16.9 | 42.3 | 105.9 | 52.3 | 141.0 | 87.0 | 143.0 |
| Amount of Bound Styrene | [wt %] | 9.9 | 9.9 | 9.9 | 9.9 | 9.9 | 25.8 | 9.9 | 9.9 | 25.8 | 0.0 | 25.8 | 12.0 |
| 1,2-Vinyl Bond Content | [mol % in Bd] | 40.3 | 40.3 | 40.3 | 40.3 | 40.3 | 58.0 | 40.3 | 40.3 | 67.0 | 40.0 | 40.3 | 57.0 |
| Tg | [° C.] | −61.1 | −63.1 | −59.6 | −58.4 | −57.2 | −34.0 | −59.6 | −63.1 | −20.0 | −74.0 | −45.3 | −56.0 |
| Ethylene Structure | [wt %] | 0.0 | 31.4 | 44.7 | 49.5 | 53.7 | 26.8 | 40.5 | 31.4 | 13.1 | 30.3 | 37.9 | 32.7 |
| Content of Styrene Block | [wt %] | 1.7 | 1.7 | 1.7 | 1.7 | 1.7 | 2.0 | 1.7 | 1.7 | 2.0 | 0.0 | 2.0 | 1.7 |

TABLE 1-continued

| | | A | AH1 | AH2 | AH3 | AH4 | BH1 | CH1 | DH1 | EH1 | FH1 | GH1 | HH1 |
|---|---|---|---|---|---|---|---|---|---|---|---|---|---|
| Conjugated Diene Monomer Unit | [wt %] | 89.6 | 21.9 | 8.8 | 4.1 | 0.0 | 3.2 | 13.0 | 21.9 | 10.3 | 29.2 | 21.3 | 32.7 |
| Modifier | | Com-pound 1 | Com-pound 1 | Com-pound 1 | Com-pound 1 | Com-pound 1 | Com-pound 1 | Com-pound 2 | Com-pound 1 | Com-pound 1 | Com-pound 1 | Com-pound 1 | Com-pound 1 |
| Modification Ratio | [wt %] | 80 | 80 | 80 | 80 | 80 | 80 | 60 | 35 | 80 | 70 | 80 | 80 |

Examples 1 to 35, Example 36 to 41 and Comparative Examples 1 to 11

The rubber-like polymers shown in Table 1, high cis polybutadiene (BR, "UBEPOL U150" manufactured by Ube Industries, Ltd.), natural rubber (NR) were used as raw material rubber components to obtain rubber compositions containing respective raw material rubbers in accordance with compositions shown in the following Tables 2 to 9 and described below.

It is noted that the tables show the amount (in parts by mass) of each raw material rubber blended by assuming that the total amount of the rubber component (A) is 100 parts by mass.

TABLE 2

| | | Unit | Comparative Example 1 | Example 1 | Example 2 | Example 3 | Example 4 | Example 5 | Example 6 | Example 36 | Example 37 | Example 38 |
|---|---|---|---|---|---|---|---|---|---|---|---|---|
| Rubber Component (A) Amount (parts by mass) Blended per 100 Parts by Mass of Rubber Component (A) | NR | | 60 | 60 | 60 | 60 | 60 | 60 | 60 | 60 | 60 | 60 |
| | BR | | | | | | | | | | | |
| | A | | 40 | | | | | | | | | |
| | AH1 | | | 40 | | | | | | | | |
| | AH2 | | | | 40 | | | | | | | |
| | AH3 | | | | | 40 | | | | 40 | | |
| | AH4 | | | | | | | 40 | | | | |
| | BH1 | | | | | | 40 | | | | | |
| | CH1 | | | | | | | 40 | | | | |
| | DH1 | | | | | | | | 40 | | | |
| | EH1 | | | | | | | | | | | |
| | FH1 | | | | | | | | | | | |
| | GH1 | | | | | | | | | | 40 | |
| | HH1 | | | | | | | | | | | 40 |
| Silica 1 | BET 165 | parts by mass | 45 | 45 | 45 | 45 | 45 | 45 | 45 | 60 | 45 | 45 |
| Silica 2 | BET 235 | parts by mass | | | | | | | | | | |
| Coupling Agent | | parts by mass | 4.5 | 4.5 | 4.5 | 4.5 | 4.5 | 4.5 | 4.5 | 6 | 4.5 | 4.5 |
| Carbon Black | BET 120 | parts by mass | 5 | 5 | 5 | 5 | 5 | 5 | 5 | 5 | 5 | 5 |
| SRAE Oil | | parts by mass | | | | | | | | | | |
| Hydrogenated Terpene | Clearon M125 | parts by mass | | | | | | | | | | |
| ZnO | | parts by mass | 3 | 3 | 3 | 3 | 3 | 3 | 3 | 3 | 3 | 3 |
| Stearic Acid | | parts by mass | 2 | 2 | 2 | 2 | 2 | 2 | 2 | 2 | 2 | 2 |
| Wax | | parts by mass | 2 | 2 | 2 | 2 | 2 | 2 | 2 | 2 | 2 | 2 |
| Anti-aging Agent | | parts by mass | 2 | 2 | 2 | 2 | 2 | 2 | 2 | 2 | 2 | 2 |
| Sulfur | | parts by mass | 2 | 2 | 2 | 2 | 2 | 2 | 2 | 2 | 2 | 2 |
| CBS | | parts by mass | 1.5 | 1.5 | 1.5 | 1.5 | 1.5 | 1.5 | 1.5 | 1.5 | 1.5 | 1.5 |
| DPG | | parts by mass | 1 | 1 | 1 | 1 | 1 | 1 | 1 | 1 | 1 | 1 |
| Expression 1 | 0 to 250 | — | −190 | 122 | 191 | 211 | 181 | 170 | 170 | 284 | 145 | 90 |
| Effects | Processability | ML(1 + 4) @100° C. | Δ | ○ | Δ | Δ | Δ | Δ | Δ | X | ○ | ○ |
| | Low Fuel Consumption Performance | tanδ @50° C. | Δ | ○ | ◎ | ○ | Δ | Δ | Δ | Δ | Δ | ◎ |
| | Abrasion Resistance | cc | Δ | ◎◎ | ◎◎ | ◎◎ | ◎ | ○ | ○ | ○ | ○ | ◎◎ |
| | Constant Elongation Fatigue Resistance | cycle | Δ | ◎ | ◎ | ○ | ○ | ◎ | ○ | Δ | ◎ | ◎◎ |
| | Fatigue Felt in Driving Truck after Tire Aging | — | Δ | ◎ | ◎◎ | ◎◎ | ◎◎ | ◎ | ◎ | ◎ | ◎ | ◎◎ |

TABLE 3

| | | Unit | Example 7 | Example 8 | Example 9 | Example 10 | Example 11 | Example 12 | Example 13 |
|---|---|---|---|---|---|---|---|---|---|
| Rubber Component (A) Amount (parts by mass) Blended per 100 Parts by Mass of Rubber Component (A) | NR | | 60 | 60 | 40 | 40 | 85 | 15 | 60 |
| | BR | | | | | | | | |
| | A | | | | | | | | |
| | AH1 | | | | 60 | | 15 | 85 | 40 |
| | AH2 | | | | | 60 | | | |
| | AH3 | | | | | | | | |
| | AH4 | | | | | | | | |
| | BH1 | | | | | | | | |
| | CH1 | | | | | | | | |
| | DH1 | | | | | | | | |
| | EH1 | | 40 | | | | | | |
| | FH1 | | | 40 | | | | | |
| | GH1 | | | | | | | | |
| | HH1 | | | | | | | | |
| Silica 1 | BET 165 | parts by mass | 45 | 45 | 45 | 45 | 45 | 45 | |
| Silica 2 | BET 235 | parts by mass | | | | | | | 45 |
| Coupling Agent | | parts by mass | 4.5 | 4.5 | 4.5 | 4.5 | 4.5 | 4.5 | 0 |
| Carbon Black | BET 120 | parts by mass | 5 | 5 | 5 | 5 | 5 | 5 | 5 |
| SRAE Oil | | parts by mass | | | | | | | |
| Hydrogenated Terpene | Clearon M125 | parts by mass | | | | | | | |
| ZnO | | parts by mass | 3 | 3 | 3 | 3 | 3 | 3 | 3 |
| Stearic Acid | | parts by mass | 2 | 2 | 2 | 2 | 2 | 2 | 2 |
| Wax | | parts by mass | 2 | 2 | 2 | 2 | 2 | 2 | 2 |
| Anti-aging Agent | | parts by mass | 2 | 2 | 2 | 2 | 2 | 2 | 2 |
| Sulfur | | parts by mass | 2 | 2 | 2 | 2 | 2 | 2 | 2 |
| CBS | | parts by mass | 1.5 | 1.5 | 1.5 | 1.5 | 1.5 | 1.5 | 1.5 |
| DPG | | parts by mass | 1 | 1 | 1 | 1 | 1 | 1 | 1 |
| Expression 1 | 0 to 250 | — | 170 | 92 | 122 | 191 | 122 | 122 | 218 |
| Effects | Processability | ML(1 + 4) @100° C. | Δ | Δ | Δ | Δ | Δ | Δ | Δ |
| | Low Fuel Consumption Performance | tanδ @50° C. | Δ | ◎ | ○ | ◎ | Δ | ○ | Δ |
| | Abrasion Resistance | cc | ○ | ◎◎ | ◎ | ◎◎ | ○ | Δ | ◎ |
| | Constant Elongation Fatigue Resistance | cycle | Δ | ◎◎ | ◎◎ | ◎ | ◎ | ◎◎ | ◎ |
| | Fatigue Felt in Driving Truck after Tire Aging | — | ◎ | ◎◎ | ◎ | ◎◎ | ○ | ◎◎ | ◎◎ |

TABLE 4

| | | Unit | Example 14 | Example 15 | Example 16 | Example 17 | Example 18 | Example 19 |
|---|---|---|---|---|---|---|---|---|
| Rubber Component (A) Amount (parts by mass) Blended per 100 Parts by Mass of Rubber Component (A) | NR | | 60 | 60 | 60 | 60 | 60 | 40 |
| | BR | | | | | | | 20 |
| | A | | | | | | | |
| | AH1 | | | | | | | |
| | AH2 | | 40 | 40 | 40 | 40 | 40 | 40 |
| | AH3 | | | | | | | |
| | AH4 | | | | | | | |
| | BH1 | | | | | | | |
| | CH1 | | | | | | | |
| | DH1 | | | | | | | |
| | EH1 | | | | | | | |
| | FH1 | | | | | | | |
| | GH1 | | | | | | | |
| | HH1 | | | | | | | |
| Silica 1 | BET 165 | parts by mass | 45 | 45 | 45 | 45 | 45 | 45 |
| Silica 2 | BET 235 | parts by mass | | | | | | |
| Coupling Agent | | parts by mass | 4.5 | 4.5 | 4.5 | 4.5 | 4.5 | 4.5 |
| Carbon Black | BET 120 | parts by mass | 5 | 5 | 5 | 5 | 5 | 5 |
| SRAE Oil | | parts by mass | 5 | | 5 | 5 | 15 | |
| Hydrogenated Terpene | Clearon M125 | parts by mass | 5 | 5 | 30 | | | |
| ZnO | | parts by mass | 3 | 3 | 3 | 3 | 3 | 3 |
| Stearic Acid | | parts by mass | 2 | 2 | 2 | 2 | 2 | 2 |
| Wax | | parts by mass | 2 | 2 | 2 | 2 | 2 | 2 |

TABLE 4-continued

| | | Unit | Example 14 | Example 15 | Example 16 | Example 17 | Example 18 | Example 19 |
|---|---|---|---|---|---|---|---|---|
| Anti-aging Agent | | parts by mass | 2 | 2 | 2 | 2 | 2 | 2 |
| Sulfur | | parts by mass | 2 | 2 | 2 | 2 | 2 | 2 |
| CBS | | parts by mass | 1.5 | 1.5 | 1.5 | 1.5 | 1.5 | 1.5 |
| DPG | | parts by mass | 1 | 1 | 1 | 1 | 1 | 1 |
| Expression 1 | 0 to 250 | — | 191 | 191 | 191 | 191 | 191 | 191 |
| Effects | Processability | ML(1 + 4) @100° C. | ⊚ | ◯ | ⊚ | ◯ | ◯ | ◯ |
| | Low Fuel Consumption Performance | tanδ @50° C. | ◯ | ⊚ | Δ | ⊚ | Δ | ⊚ |
| | Abrasion Resistance | cc | ◯ | ⊚ | Δ | ⊚ | ◯ | ⊚ ⊚ |
| | Constant Elongation Fatigue Resistance | cycle | ⊚ | ⊚ | ⊚ | ⊚ | ⊚ | ⊚ |
| | Fatigue Felt in Driving Truck after Tire Aging | — | ⊚ | ⊚ | ⊚ | ⊚ | ◯ | ⊚ ⊚ |

TABLE 5

| | | Unit | Comparative Example 2 | Comparative Example 3 | Comparative Example 4 | Comparative Example 5 | Comparative Example 6 |
|---|---|---|---|---|---|---|---|
| Rubber Component (A) Amount (parts by mass) Blended per 100 Parts by Mass of Rubber Component (A) | NR | | 60 | 95 | 5 | 60 | 60 |
| | BR | | | | | | |
| | A | | | | | | |
| | AH1 | | | 5 | 95 | | 40 |
| | AH2 | | | | | 40 | |
| | AH3 | | | | | | |
| | AH4 | | 40 | | | | |
| | BH1 | | | | | | |
| | CH1 | | | | | | |
| | DH1 | | | | | | |
| | EH1 | | | | | | |
| | FH1 | | | | | | |
| | GH1 | | | | | | |
| | HH1 | | | | | | |
| Silica 1 | BET 165 | parts by mass | 45 | 45 | 45 | 65 | |
| Silica 2 | BET 235 | parts by mass | | | | | 65 |
| Coupling Agent | | parts by mass | 4.5 | 4.5 | 4.5 | 6.5 | 0 |
| Carbon Black | BET 120 | parts by mass | 5 | 5 | 5 | 5 | 5 |
| SRAE Oil | | parts by mass | | | | | |
| Hydrogenated Terpene | Clearon M125 | parts by mass | | | | | |
| ZnO | | parts by mass | 3 | 3 | 3 | 3 | 3 |
| Stearic Acid | | parts by mass | 2 | 2 | 2 | 2 | 2 |
| Wax | | parts by mass | 2 | 2 | 2 | 2 | 2 |
| Anti-aging Agent | | parts by mass | 2 | 2 | 2 | 2 | 2 |
| Sulfur | | parts by mass | 2 | 2 | 2 | 2 | 2 |
| CBS | | parts by mass | 1.5 | 1.5 | 1.5 | 1.5 | 1.5 |
| DPG | | parts by mass | 1 | 1 | 1 | 1 | 1 |
| Expression 1 | 0 to 250 | — | 233 | 122 | 122 | 286 | 354 |
| Effects | Processability | ML(1 + 4) @100° C. | X | Δ | X | X | X |
| | Low Fuel Consumption Performance | tanδ @50° C. | Δ | X | ◯ | Δ | X |
| | Abrasion Resistance | cc | ⊚ | X | ⊚ | ◯ | ⊚ |
| | Constant Elongation Fatigue Resistance | cycle | Δ | X | ⊚ | Δ | Δ |
| | Fatigue Felt in Driving Truck after Tire Aging | — | ⊚ | X | ⊚ | Δ | ⊚ ⊚ |

TABLE 6

| | | Unit | Comparative Example 7 | Example 20 | Example 21 | Example 22 | Example 23 | Example 24 | Example 39 | Example 40 | Example 41 |
|---|---|---|---|---|---|---|---|---|---|---|---|
| Rubber | NR | | 60 | 60 | 60 | 60 | 60 | 60 | 60 | 60 | 60 |
| Component (A) | BR | | | | | | | | | | |
| Amount (parts | A | | 40 | | | | | | | | |
| by mass) | AH1 | | | 40 | | | | | | | |
| Blended per | AH2 | | | | 40 | | | | | | |
| 100 Parts by | AH3 | | | | | 40 | | | 40 | | |
| Mass of | AH4 | | | | | | | | | | |
| Rubber | BH1 | | | | | | 40 | | | | |
| Component (A) | CH1 | | | | | | | 40 | | | |
| | DH1 | | | | | | | | | | |
| | EH1 | | | | | | | | | | |
| | FH1 | | | | | | | | | | |
| | GH1 | | | | | | | | | 40 | |
| | HH1 | | | | | | | | | | 40 |
| Silica 1 | BET 165 | parts by mass | 20 | 20 | 20 | 20 | 20 | 20 | 35 | 20 | 20 |
| Coupling Agent | | parts by mass | 2 | 2 | 2 | 2 | 2 | 2 | 3.5 | 2 | 2 |
| Carbon Black | BET 120 | parts by mass | 30 | 30 | 30 | 30 | 30 | 30 | 30 | 30 | 30 |
| SRAE Oil | | parts by mass | | | | | | | | | |
| Hydrogenated Terpene | Clearon M125 | parts by mass | | | | | | | | | |
| ZnO | | parts by mass | 3 | 3 | 3 | 3 | 3 | 3 | 3 | 3 | 3 |
| Stearic Acid | | parts by mass | 2 | 2 | 2 | 2 | 2 | 2 | 2 | 2 | 2 |
| Wax | | parts by mass | 2 | 2 | 2 | 2 | 2 | 2 | 2 | 2 | 2 |
| Anti-aging Agent | | parts by mass | 2 | 2 | 2 | 2 | 2 | 2 | 2 | 2 | 2 |
| Sulfur | | parts by mass | 2 | 2 | 2 | 2 | 2 | 2 | 2 | 2 | 2 |
| CBS | | parts by mass | 1.5 | 1.5 | 1.5 | 1.5 | 1.5 | 1.5 | 1.5 | 1.5 | 1.5 |
| DPG | | parts by mass | 1 | 1 | 1 | 1 | 1 | 1 | 1 | 1 | 1 |
| Expression 1 | 0 to 250 | — | −223 | 94 | 158 | 179 | 183 | 158 | 179 | 113 | 57 |
| Effects | Processability | ML(1 + 4) @100° C. | Δ | ○ | Δ | Δ | Δ | Δ | X | ○ | ○ |
| | Low Fuel Consumption Performance | tanδ @50° C. | Δ | ○ | ◎ | ○ | Δ | Δ | Δ | Δ | ◎ |
| | Abrasion Resistance | cc | Δ | ◎◎ | ◎◎ | ◎◎ | ○ | ○ | ○ | ○ | ◎◎ |
| | Constant Elongation Fatigue Resistance | cycle | Δ | ◎ | ◎ | ○ | ○ | ◎ | Δ | ◎ | ◎◎ |
| | Fatigue Felt in Driving Truck after Tire Aging | — | Δ | ◎ | ◎◎ | ◎◎ | ◎ | ◎ | ◎ | ◎ | ◎◎ |

TABLE 7

| | | Unit | Example 25 | Example 26 | Example 27 | Example 28 | Example 29 | Example 30 |
|---|---|---|---|---|---|---|---|---|
| Rubber | NR | | 60 | 60 | 60 | 85 | 15 | 60 |
| Component (A) | BR | | | | | | | |
| Amount (parts by | A | | | | | | | |
| mass) Blended | AH1 | | | | | 15 | 85 | |
| per 100 Parts by | AH2 | | | | | | | 40 |
| Mass of Rubber | AH3 | | | | | | | |
| Component (A) | AH4 | | | | | | | |
| | BH1 | | | | | | | |
| | CH1 | | | | | | | |
| | DH1 | | 40 | | | | | |
| | EH1 | | | 40 | | | | |
| | FH1 | | | | 40 | | | |
| | GH1 | | | | | | | |
| | HH1 | | | | | | | |
| Silica 1 | BET 165 | parts by mass | 20 | 20 | 20 | 20 | 20 | 20 |
| Coupling Agent | | parts by mass | 2 | 2 | 2 | 2 | 2 | 2 |
| Carbon Black | BET 120 | parts by mass | 30 | 30 | 30 | 30 | 30 | 30 |
| SRAE Oil | | parts by mass | | | | | | 5 |
| Hydrogenated Terpene | Clearon M125 | parts by mass | | | | | | 5 |

TABLE 7-continued

| | | Unit | Example 25 | Example 26 | Example 27 | Example 28 | Example 29 | Example 30 |
|---|---|---|---|---|---|---|---|---|
| ZnO | | parts by mass | 3 | 3 | 3 | 3 | 3 | 3 |
| Stearic Acid | | parts by mass | 2 | 2 | 2 | 2 | 2 | 2 |
| Wax | | parts by mass | 2 | 2 | 2 | 2 | 2 | 2 |
| Anti-aging Agent | | parts by mass | 2 | 2 | 2 | 2 | 2 | 2 |
| Sulfur | | parts by mass | 2 | 2 | 2 | 2 | 2 | 2 |
| CBS | | parts by mass | 1.5 | 1.5 | 1.5 | 1.5 | 1.5 | 1.5 |
| DPG | | parts by mass | 1 | 1 | 1 | 1 | 1 | 1 |
| Expression 1 | 0 to 250 | — | 94 | 148 | 59 | 94 | 94 | 158 |
| Effects | Processability | ML(1 + 4) @100° C. | X | Δ | Δ | Δ | Δ | ◎ |
| | Low Fuel Consumption Performance | tanδ @50° C. | Δ | Δ | ◎ | Δ | ○ | ○ |
| | Abrasion Resistance | cc | ○ | Δ | ◎◎ | ○ | Δ | ○ |
| | Constant Elongation Fatigue Resistance | cycle | ○ | Δ | ◎◎ | ◎ | ◎◎ | ◎ |
| | Fatigue Felt in Driving Truck after Tire Aging | — | ◎ | ◎ | ◎◎ | ○ | ◎ | ◎ |

TABLE 8

| | | Unit | Example 31 | Example 32 | Example 33 | Example 34 | Example 35 |
|---|---|---|---|---|---|---|---|
| Rubber | NR | | 60 | 60 | 60 | 60 | 40 |
| Component (A) | BR | | | | | | 20 |
| Amount (parts | A | | | | | | |
| by mass) | AH1 | | | | | | |
| Blended per 100 | AH2 | | 40 | 40 | 40 | 40 | 40 |
| Parts by Mass | AH3 | | | | | | |
| of Rubber | AH4 | | | | | | |
| Component (A) | BH1 | | | | | | |
| | CH1 | | | | | | |
| | DH1 | | | | | | |
| | EH1 | | | | | | |
| | FH1 | | | | | | |
| | GH1 | | | | | | |
| | HH1 | | | | | | |
| Silica 1 | BET 165 | parts by mass | 20 | 20 | 20 | 20 | 20 |
| Coupling Agent | | parts by mass | 2 | 2 | 2 | 2 | 2 |
| Carbon Black | BET 120 | parts by mass | 30 | 30 | 30 | 30 | 30 |
| SRAE Oil | | parts by mass | | 5 | 5 | 15 | |
| Hydrogenated Terpene | Clearon M125 | parts by mass | 5 | 30 | | | |
| ZnO | | parts by mass | 3 | 3 | 3 | 3 | 3 |
| Stearic Acid | | parts by mass | 2 | 2 | 2 | 2 | 2 |
| Wax | | parts by mass | 2 | 2 | 2 | 2 | 2 |
| Anti-aging Agent | | parts by mass | 2 | 2 | 2 | 2 | 2 |
| Sulfur | | parts by mass | 2 | 2 | 2 | 2 | 2 |
| CBS | | parts by mass | 1.5 | 1.5 | 1.5 | 1.5 | 1.5 |
| DPG | | parts by mass | 1 | 1 | 1 | 1 | 1 |
| Expression 1 | 0 to 250 | — | 158 | 158 | 158 | 158 | 158 |
| Effects | Processability | ML(1 + 4) @100° C. | ○ | ◎ | ○ | ○ | ○ |
| | Low Fuel Consumption Performance | tanδ @50° C. | ◎ | Δ | ◎ | Δ | ◎ |
| | Abrasion Resistance | cc | ◎ | Δ | ◎ | ○ | ◎◎ |
| | Constant Elongation Fatigue Resistance | cycle | ◎ | ◎ | ◎ | ◎ | ◎ |
| | Fatigue Felt in Driving Truck after Tire Aging | — | ◎ | ◎ | ◎ | ○ | ◎◎ |

TABLE 9

| | | Unit | Comparative Example 8 | Comparative Example 9 | Comparative Example 10 | Comparative Example 11 |
|---|---|---|---|---|---|---|
| Rubber | NR | | 60 | 95 | 5 | 60 |
| Component (A) | BR | | | | | |
| Amount (parts | A | | | | | |
| by mass) | AH1 | | | 5 | 95 | |
| Blended per 100 | AH2 | | | | | 40 |
| Parts by Mass | AH3 | | | | | |
| of Rubber | AH4 | | 40 | | | |
| Component (A) | BH1 | | | | | |
| | CH1 | | | | | |
| | DH1 | | | | | |
| | EH1 | | | | | |
| | FH1 | | | | | |
| | GH1 | | | | | |
| | HH1 | | | | | |
| Silica 1 | BET 165 | parts by mass | 20 | 20 | 20 | |
| Coupling Agent | | parts by mass | 2 | 2 | 2 | |
| Carbon Black | BET 120 | parts by mass | 30 | 30 | 30 | 65 |
| SRAE Oil | | parts by mass | | | | |
| Hydrogenated Terpene | Clearon M125 | parts by mass | | | | |
| ZnO | | parts by mass | 3 | 3 | 3 | 3 |
| Stearic Acid | | parts by mass | 2 | 2 | 2 | 2 |
| Wax | | parts by mass | 2 | 2 | 2 | 2 |
| Anti-aging Agent | | parts by mass | 2 | 2 | 2 | 2 |
| Sulfur | | parts by mass | 2 | 2 | 2 | 2 |
| CBS | | parts by mass | 1.5 | 1.5 | 1.5 | 1.5 |
| DPG | | parts by mass | 1 | 1 | 1 | 1 |
| Expression 1 | 0 to 250 | — | 158 | 94 | 94 | 184 |
| Effects | Processability | ML(1 + 4) @100° C. | X | Δ | X | ○ |
| | Low Fuel Consumption Performance | tanδ @50° C. | Δ | X | ○ | X |
| | Abrasion Resistance | cc | X | X | ◎ | ◎ |
| | Constant Elongation Fatigue Resistance | cycle | Δ | X | ○ | Δ |
| | Fatigue Felt in Driving Truck after Tire Aging | — | ◎ | X | ◎ | ◎ |

Names of products used as the respective components shown in Tables 2 to 9 were as follows:

Silica 1 (trade name "Ultrasil 7000GR" manufactured by Evonik Degussa, nitrogen adsorption specific surface area: 165 m²/g)

Silica 2 (trade name "Ultrasil 9100GR" manufactured by Evonik Degussa, nitrogen adsorption specific surface area: 235 m2/g)

Carbon black (trade name "N234" manufactured by Cabot Japan K.K.)

S-RAE Oil (trade name "Process NC140" manufactured by JX Nippon Oil & Energy Corporation)

Hydrogenated terpene (trade name "Clearon M125" manufactured by Yasuhara Chemical Co., Ltd.)

Coupling agent (trade name "Si69" manufactured by Evonik Degussa, bis(triethoxysilylpropyl)tetradisulfide)

Anti-aging agent (N-(1,3-dimethylbutyl)-N'-phenyl-p-phenylenediamine)

Vulcanization accelerator 1 (CBS) (N-cyclohexyl-2-benzothiazylsulfinamide)

Vulcanization accelerator 2 (DPG) (diphenylguanidine) Wax (paraffin wax)

The above-described materials were kneaded by the following method to obtain each rubber composition.

A closed kneader (having an internal capacity of 0.3 L) equipped with a temperature controller was used to knead, as first stage kneading, the raw material rubbers (the rubber-like polymer, the natural rubber, and the high cis polybutadiene), the filler (silica and carbon black), the silane coupling agent, the process oil, zinc powder and stearic acid under conditions of a filling rate of 65% and a rotor speed of 30 to 50 rpm.

Here, the temperature of the closed mixer was controlled to obtain each rubber composition (compound) at a discharge temperature of 155 to 160° C.

Next, as second stage kneading, after the compound obtained as described above was cooled to room temperature, the anti-aging agent was added thereto, and the resultant was kneaded again for improving dispersibility of the silica-based inorganic filler.

Also in this case, the discharge temperature of the compound was adjusted to 145 to 150° C. by the temperature control of the mixer.

After cooling, as third stage kneading, the resultant was kneaded with sulfur and the vulcanization accelerators 1 and 2 added thereto with an open roll set to 70° C. Thereafter, the resultant was molded, and vulcanized with a vulcanization press at 150° C. for 25 minutes. Each rubber composition before vulcanization and the rubber composition after the vulcanization were evaluated for their properties.

Specifically, the evaluation was performed by the following methods. Results are shown in Tables 2 to 9.

[Evaluation of Properties]

(Evaluation 1) Processability: Mooney Viscosity of Compound

Each compound obtained after the second stage kneading and before the third stage kneading performed as described above was used as a sample, and the viscosity was measured with a Mooney viscometer in accordance with JIS K6300-1 after preheating at 130° C. for 1 minute and after rotating the rotor at 2 rpm for 4 minutes.

Each value was expressed as an index by assuming that a result obtained in Comparative Example 1 and a result obtained in Comparative Example 7 were 100 respectively in Tables 2 to 5 and Tables 6 to 9. A larger index indicates better processability.

As for all the indexes, assuming that a test result obtained in a tire using the rubber composition of Comparative Example 1 and a result of Comparative Example 7 were evaluated as Δ respectively in Tables 2 to 5 and Tables 6 to 9, evaluation was made as ○ when the effect was improved by 5% or more and less than 15%, and as ◎ when the effect was improved by 15% or more and less than 20%, and as ◎◎ when the effect was improved by 20% or more.

(Evaluation 2) Low Fuel Consumption Performance: Viscosity Parameter

A viscosity tester "ARES" manufactured by Rheometric Scientific was used to measure a viscosity parameter in a twist mode.

Each measured value was expressed as an index by assuming that a result obtained from the rubber composition of Comparative Example 1 and a result of Comparative Example 7 were 100 respectively in Tables 2 to 5 and Tables 6 to 9.

A tan δ measured at 50° C., a frequency of 10 Hz, and a strain of 3% was used as an index of fuel economy. A larger index indicates better fuel economy.

As for all the indexes, assuming that a test result obtained in a tire using the rubber composition of Comparative Example 1 and a result of Comparative Example 7 were evaluated as Δ respectively in Tables 2 to 5 and Tables 6 to 9, evaluation was made as ○ when the effect was improved by 5% or more and less than 15%, and as ◎ when the effect was improved by 15% or more and less than 20%, and as ◎◎ when the effect was improved by 20% or more.

(Evaluation 3) Abrasion Resistance

An Akron abrasion tester (manufactured by Yasuda Seiki Seisakusho, Ltd.) was used to measure an amount of abrasion caused at a load of 44.4 N through 1,000 rotations in accordance with JIS K6264-2, and the thus obtained result was expressed as an index by assuming that a result of Comparative Example 1 and a result of Comparative Example 7 were 100 respectively in Tables 2 to 5 and Tables 6 to 9. A larger index indicates better abrasion resistance.

As for all the indexes, assuming that a test result obtained in a tire using the rubber composition of Comparative Example 1 and a result of Comparative Example 7 were evaluated as Δ respectively in Tables 2 to 5 and Tables 6 to 9, evaluation was made as ○ when the effect was improved by 5% or more and less than 15%, and as ◎ when the effect was improved by 15% or more and less than 20%, and as ◎◎ when the effect was improved by 20% or more.

(Evaluation 4) Constant Elongation Fatigue Resistance

A constant elongation fatigue testing machine (manufactured by MYS-TESTER Company Limited) was used to measure the number of times of elongation caused until rupture by repeatedly causing elongation at a strain of 80% and a rate of 300 cpm in accordance with JIS K6260, and results were expressed as indexes obtained by assuming that a result of Comparative Example 1 and a result of Comparative Example 7 were 100 respectively in Tables 2 to 5 and Tables 6 to 9. A larger index indicates that the number of times of elongation caused until rupture is larger, and that constant elongation fatigue resistance is favorable.

As for all the indexes, assuming that a test result obtained in a tire using the rubber composition of Comparative Example 1 and a result of Comparative Example 7 were evaluated as Δ respectively in Tables 2 to 5 and Tables 6 to 9, evaluation was made as ○ when the effect was improved by 5% or more and less than 15%, and as ◎ when the effect was improved by 15% or more and less than 20%, and as ◎◎ when the effect was improved by 20% or more.

(Evaluation 5) Ride Comfort in Driving Truck after Tire Aging

A method for evaluating performance change caused at a later stage of use of a tire will now be described.

A 275/80 R 22.5 tire having a load index of 151 and using each rubber composition in a tread was produced, was aged in a thermostat at 80° C. for 72 hours, and was then put on a vehicle having a carrying capacity of 20 tons to evaluate ride comfort in running over a distance of about 100 km including a general road and a highway.

When a tire is aged, the hardness is increased, and other physical properties are changed, resulting in deteriorating ride comfort.

Each value was expressed as an index by assuming that a result of Comparative 1 and a result of Comparative Example 7 were 100 respectively in Tables 2 to 5 and Tables 6 to 9.

As for all the indexes, assuming that a test result obtained in a tire using the rubber composition of Comparative Example 1 and a result of Comparative Example 7 were evaluated as Δ respectively in Tables 2 to 5 and Tables 6 to 9, evaluation was made as ○ when the effect was improved by 5% or more and less than 15%, and as ◎ when the effect was improved by 15% or more and less than 20%, and as ◎◎ when the effect was improved by 20% or more.

As shown in Tables 2 to 9, it was confirmed that Examples 1 to 41 are excellent, as compared with Comparative Examples 1 to 11, in balance among processability, low fuel consumption performance and abrasion resistance of the rubber compositions and also can suppress performance change otherwise caused at a later stage of use of the tires.

This application is based upon and claims the benefit of priority of the prior Japanese Patent Application (Japanese Patent Application No. 2020-182774) filed in Japanese Patent Office on Oct. 30, 2020, the entire contents of which are incorporated herein by reference.

INDUSTRIAL APPLICABILITY

A rubber composition of the present invention is industrially applicable in the fields of treads of pneumatic tires for heavy-load vehicles, interiors and exteriors of vehicles, anti-vibration rubbers, belts, shoes, foam materials, and various industrial products.

The invention claimed is:

1. A rubber composition, comprising:

10 parts by mass or more and 90 parts by mass or less of a rubber polymer having an iodine value of 10 to 200 (g/100 g), a content of an ethylene structure of 3% by mass or more, a content of an aromatic vinyl monomer block of less than 10% by mass, and a content of a conjugated diene monomer unit of 2% by mass or more;

10 parts by mass or more and 90 parts by mass or less of a natural rubber; and 20 parts by mass or more and 80 parts by mass or less of a silica-based inorganic filler and a carbon black, with respect to 100 parts by mass of a total amount of a rubber component comprising the rubber polymer and the natural rubber, wherein a content of the silica-based inorganic filler is 60 parts by mass or less, and a content of the carbon black is 60 parts by mass or less.

2. The rubber composition according to claim 1, wherein the rubber polymer has a glass transition temperature (Tg) of −35° C. or less.

3. The rubber composition according to claim 1, wherein the rubber polymer is a conjugated diene-based polymer, and comprises 5% by mass or more and 40% by mass or less of an aromatic vinyl monomer unit, and a 1,2-vinyl bond content in a conjugated diene monomer unit is 10 mol % or more and 60 mol % or less.

4. The rubber composition according to claim 1, wherein the rubber polymer comprises a nitrogen atom.

5. The rubber composition according to claim 4, wherein the rubber polymer has a modification ratio of 40% by mass or more.

6. The rubber composition according to claim 1, wherein the iodine value (A) of the rubber polymer, the content (in parts by mass) (B) of the silica-based inorganic filler and the content (in parts by mass) (C) of the carbon black with respect to 100 parts by mass of the total amount of the rubber component, a BET specific surface area (D) of the silica-based inorganic filler, and a BET specific surface area (E) of the carbon black have a relationship of the following expression (1):

$$0<(0.029\times((B)\times(D))+((C)\times(E)))-(A)<250 \qquad \text{Expression (1).}$$

7. The rubber composition according to claim 1, further comprising an oil and/or a ring-containing resin in an amount of less than 35 parts by mass with respect to 100 parts by mass of the total amount of the rubber component.

8. The rubber composition according to claim 1, further comprising an oil in an amount of less than 10 parts by mass with respect to 100 parts by mass of the total amount of the rubber component.

9. The rubber composition according to claim 1, wherein the iodine value of the rubber polymer is 80 to 200 (g/100 g), and a content of an aromatic vinyl monomer unit is 13% by mass or less.

10. The rubber composition according to claim 1, wherein a 1,2-vinyl bond content in the conjugated diene monomer unit of the rubber polymer is 50 mol % or more and 60 mol % or less.

11. The rubber composition according to claim 1, wherein the iodine value (A) of the rubber polymer, the content (in parts by mass) (B) of the silica-based inorganic filler and the content (in parts by mass) (C) of the carbon black with respect to 100 parts by mass of the total amount of the rubber component, a BET specific surface area (D) of the silica-based inorganic filler, and a BET specific surface area (E) of the carbon black have a relationship of the following expression (2):

$$0<(0.029\times((B)\times(D))+((C)\times(E)))-(A)<136. \qquad \text{Expression (2):}$$

12. A tire comprising the rubber composition according to claim 1.

13. A pneumatic tire comprising a cap tread comprising the rubber composition according to claim 1, and having a load index of 100 or more and 170 or less.

\* \* \* \* \*